(12) United States Patent
Welch, Jr. et al.

(10) Patent No.: US 7,258,532 B2
(45) Date of Patent: *Aug. 21, 2007

(54) BUOYANCY PUMP DEVICE

(75) Inventors: Kenneth W. Welch, Jr., Eden Prairie, MN (US); Curtis J. Rothi, Anoka, MN (US); Harold L. Rothi, Otsego, MN (US)

(73) Assignee: Indepedent Natural Resources, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/093,338

(22) Filed: Mar. 29, 2005

(65) Prior Publication Data

US 2005/0169774 A1   Aug. 4, 2005

Related U.S. Application Data

(63) Continuation of application No. 10/270,387, filed on Oct. 10, 2002.

(51) Int. Cl.
    *F04B 35/00* (2006.01)
(52) U.S. Cl. .................. 417/333; 417/331
(58) Field of Classification Search .......... 417/330, 417/331, 333; 60/495, 496, 497
    See application file for complete search history.

(56) References Cited

U.S. PATENT DOCUMENTS

| 416,972 | A |   | 12/1889 | Thomas |
|---------|---|---|---------|--------|
| 450,434 | A | * | 4/1891  | Thomas ............... 417/333 |
| 597,832 | A |   | 1/1898  | Palmer |
| 597,833 | A |   | 1/1898  | Palmer |

(Continued)

FOREIGN PATENT DOCUMENTS

FR   2 479 343   10/1981

(Continued)

OTHER PUBLICATIONS

PCT International Search Report dated Feb. 9, 2004, International Application No. PCT/US03/32374.

(Continued)

*Primary Examiner*—Charles G. Freay
(74) *Attorney, Agent, or Firm*—Patton Boggs LLP

(57) ABSTRACT

A buoyancy pump device for use in fluid. The buoyancy pump device includes a buoyancy block housing defining a buoyancy chamber therein through which the fluid may flow. A buoyancy block is disposed within the buoyancy chamber to move axially therein in a first direction responsive to rising of the fluid in the buoyancy chamber and a second direction responsive to lowering of the fluid in the buoyancy chamber. A piston cylinder is connected to the buoyancy block housing and has at least one valve disposed therein operating as an inlet in response to movement of the buoyancy block in the second direction and an outlet in response to movement of the buoyancy block in the first direction. A piston is slideably disposed within the piston cylinder and connected to the buoyancy block, the piston being moveable in the first and second directions and responsive to movement of the buoyancy block in the second direction to draw a gas or liquid substance into the piston cylinder through the at least one valve, and responsive to movement of the buoyancy block in the first direction to output the gas or liquid substance through the at least one valve.

12 Claims, 9 Drawing Sheets

U.S. PATENT DOCUMENTS

| | | | |
|---|---|---|---|
| 631,994 A | 8/1899 | Montague | |
| 646,199 A | 3/1900 | Walker | |
| 657,355 A | 9/1900 | Nagler | |
| 1,036,502 A | 8/1912 | Marsden | |
| 1,105,249 A | 7/1914 | Bustos | |
| 1,358,259 A | 11/1920 | Stein | |
| 1,523,031 A | 1/1925 | Mitchell, Jr. | |
| 2,871,790 A * | 2/1959 | Weills | 417/333 |
| 3,047,207 A | 7/1962 | Baldwin et al. | |
| 3,487,228 A | 12/1969 | Kriegel | |
| 4,103,490 A | 8/1978 | Gorlov | |
| 4,185,464 A | 1/1980 | Rainey | |
| 4,208,878 A * | 6/1980 | Rainey | 60/496 |
| 4,249,084 A * | 2/1981 | Villanueva et al. | 290/53 |
| 4,398,095 A | 8/1983 | Ono | |
| 4,425,510 A | 1/1984 | Jury | |
| 4,455,824 A | 6/1984 | Dabringhaus | |
| 4,464,080 A | 8/1984 | Gorlov | |
| 4,603,551 A | 8/1986 | Wood | |
| 4,622,473 A | 11/1986 | Curry | |
| 4,698,969 A * | 10/1987 | Raichlen et al. | 60/502 |
| 4,726,188 A | 2/1988 | Woolfolk | |
| 4,739,182 A * | 4/1988 | Kenderi | 290/54 |
| 4,742,241 A | 5/1988 | Melvin | |
| 4,773,221 A | 9/1988 | Noren | |
| 4,914,915 A | 4/1990 | Linderfelt | |
| 5,186,822 A | 2/1993 | Tzong et al. | |
| 6,388,342 B1 | 5/2002 | Vetterick, Sr. et al. | |
| 6,647,716 B2 | 11/2003 | Boyd | |
| 6,772,592 B2 | 8/2004 | Gerber et al. | |
| 6,800,954 B1 | 10/2004 | Meano | |
| 6,953,328 B2 * | 10/2005 | Welch et al. | 417/333 |
| 7,059,123 B2 * | 6/2006 | Welch et al. | 60/398 |
| 2002/0047273 A1 | 4/2002 | Burns et al. | |

FOREIGN PATENT DOCUMENTS

| WO | WO 00/05501 | 2/2000 |
|---|---|---|
| WO | WO 02/057623 A1 | 7/2002 |

OTHER PUBLICATIONS

Richard Boud; "Status and Research and Development Priorities, 2003—Wave and Marine Current Energy"; International Energy Agency: DTI Report No. FES-R-132; AEAT Report No. AEAT/EVN/1054; pp. 1-77.

OWEC Proposal; (Prior Wave Energy Conversion Techniques); publication date unknown; pp. 1-4; www.owec.com.

Australian CRC for Renewable Energy, Ltd.; Wave Energy Systems, pp. 1-4; publication date unknown; www.acre.murdoch.edu.au.

ATLAS; Wave Energy—Current Market Position; p. 1; publication date unknown; www.europa.eu.int.

ATLAS; Wave Energy—The Technology—Offshore Devices; pp. 1-2; publication date unknown; www.europa.eu.int.

Wave Dragon website; "Wave Dragon—a large offshore wave energy converter"; pp. 1-27; publication date unknown; www.wavedragon.net.

Ocean Power Delivery Ltd. website; "The Pelamis Wave Energy Converter"; pp. 1-2; publication date unknown; www.oceanpd.com.

Hydam Technology Limited website; pp. 1-4; publication date unknown; www.wave-power.com.

Archimedes Wave Swing website; pp. 1-8; publication date unknown; www.waveswing.wwxs.net.

AquaEnergy Group Ltd. website; pp. 1-8; publication date unknown; www.aquaenergygroup.com.

Float Incorporated website; "The Pneumatically Stabilized Platform or PSP"; pp. 1-8; Feb. 22, 2004; www.floatinc.com.

Ocean Power Technologies website; The Power of Waves. The Future of Energy:, pp. 1-5; publication date unknown; www.oceanpowertechnologies.com.

Scientific Applications & Research Associates (SARA) Inc. website; "Renewable & Alternative Electrical Energy"; pp. 1-4; publication date unknown; www.sara.com.

Energetech webiste: "Sustainable and Innovative Energy"; pp. 1-4; publication date unknown; www.energetech.com.au.

EUREKA website; "Wave Power"; pp. 1-2; publication date unknown; www.eureka.be.

Global Technology website; "Plymouth launches new power source on the crest of a wave!"; pp. 1-2; publication date unknown; www.globaltechnoscan.com.

J R M Taylor, I Mackay; "The Design of an eddy current dynamometer for a free-floating sloped IPS buoy"; Paper given at MAREC 2001 International Conference on Marine Renewable Energies organized by the Institute of Marine Engineers and the University of Newcastle; Mar. 2001; pp. 1-11; www.mech.ed.ac.uk.

World Energy website; "WEC Survey of Energy Resources 2001—Wave Energy:" pp. 1-15; publication date unknown; www.worldenergy.org.

Wavegen website; pp. 1-4; publication date unknown; www.wavegen.co.uk.

DaeDalus ltd. website; "Introduction to an advanced Hybrid (Wave & Wind) Renewable Energy Technology (RET) Multipurpose System"; pp. 1-5; publication date unknown; 195.170.12.01/DAEI/PRODUCTS/RET/General/RETWW1.html.

Ocean Motion International website; "Floating Platform"; no information available on website; www.oceanmotion.net.

Kvaerner website; "Offshore OWC"; no information available on website; www.kvaemer.com.

U.S. Myriad Technologies website; "SEAGENS"; no company website information available.

SeaVolt Technologies website; "Wave Rider"; no information available on website; www.seapower.cc.

Edinburgh University; "Salter Duck"; no company website information available.

"Sea Clam"; no company website information available.

"Tapchan"; no company website information available.

Muroran Institute of Technology and Cold-Region Port and Harbor Research Center website; "Pendulor"; no information available on website; www.muroran-it.ac.jp.

Japan Marine Science and Technology Center website; "Mighty Whale"; no information available on website; www.jamstec.go.jp.

Yoshio Masuda of Japan; "Backward Bend Duct Buoy"; no website information available.

"Swedish Hosepump"; no company information available.

Lancaster University—Professor French website; "PS Frog"; no website information available.

J.R. Thomas; The Absorption of Wave Energy by a Three-Dimensional Submerged Duct; Journal of Fluid Mechanics, Cambridge University Press, Cambridge, GB; vol. 104; Mar. 1981; pp. 189-215.

T.J.T. Whittaker and F.A. McPeake; Design Optimization of Axi-Symmetric Tall Tube Buoys; Hydrodynamics of Ocean Wave-Energy Utilization; IUTAM Symposium, 1985; pp. 103-111.

Kenneth P. Melvin; A Wave Energy Engine and Proposals for Its Development and Usage; IEEE 1988; pp. 1055-1060.

PCT International Search Report dated Jul. 19, 2004, International Application No. PCT/US03/32377.

* cited by examiner

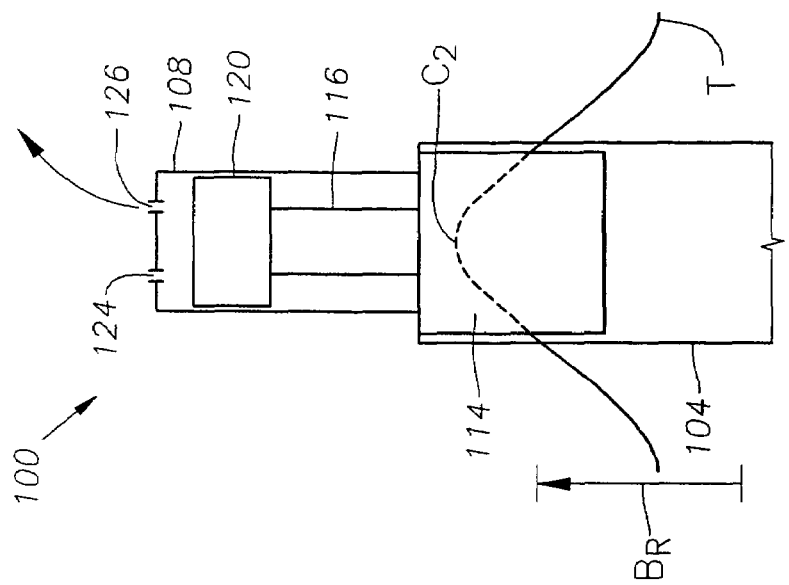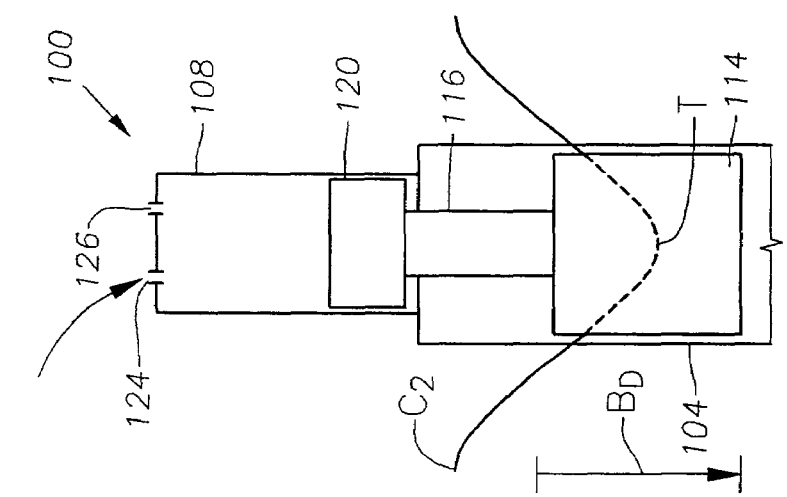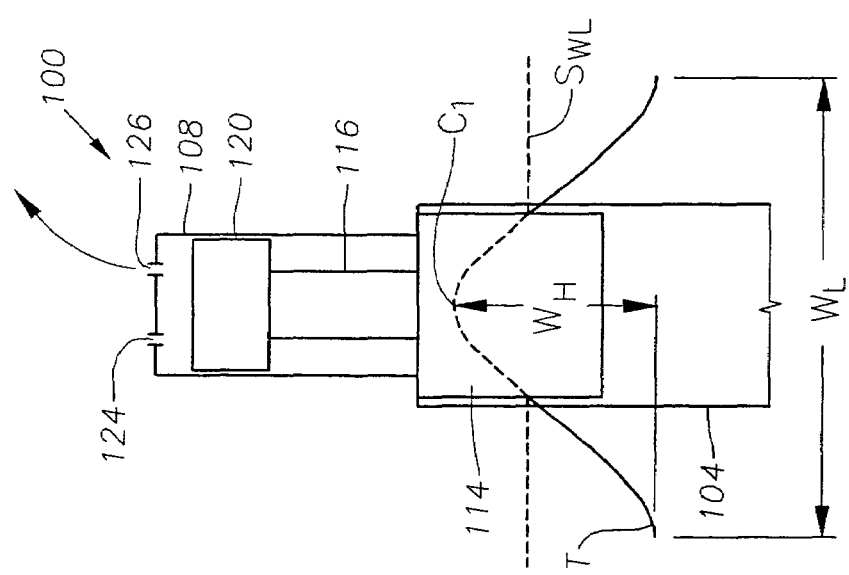

BUOYANCY PUMP DEVICE

CROSS-REFERENCES TO RELATED APPLICATIONS

This application is a continuation of prior U.S. patent application Ser. No. 10/270,387, filed Oct. 10, 2002, which is hereby incorporated by reference.

BACKGROUND OF THE INVENTION

1. Field of the Invention

The present invention relates, in general, to a pumping device, and more particular but not by way of limitation, to a buoyancy pumping device that utilizes a moving volume of water to move gas, liquid and combinations thereof from a first location to a second location.

2. Description of Related Art

There have been many attempts to harness what is commonly referred as to wave phenomena and to translate energy observed in wave phenomena into usable, reliable energy sources. Wave phenomena involves the transmission of energy and momentum by means by vibratory impulses through various states of matter, and in the case of electromagnetic waves for example, through a vacuum. Theoretically, the medium itself does not move as the energy passes through. The particles that make up the medium simply move in a translational or angular (orbital) pattern transmitting energy from one to another. Waves, such as those on an ocean surface, have particle movements that are neither longitudinal nor transverse. Rather, movement of particles in the wave typically involve components of both longitudinal and transverse waves. Longitudinal waves typically involve particles moving back and forth in a direction of energy transmission. These waves transmit energy through all states of matter. Transverse waves typically involve particles moving back and forth at right angles to the direction of energy transmission. These waves transmit energy only through solids. In an orbital wave, particles move in an orbital path. These waves transmit energy along an interface between two fluids (liquids or gases).

Waves occurring for example on an ocean surface, typically involve components of both the longitudinal wave and the transverse wave, since the particles in the ocean wave move in circular orbits at an interface between the atmosphere and the ocean. Waves typically have several readily identifiable characteristics. Such characteristics include: the crest, which is the highest point of the wave; the trough, which is the lowest point of the wave; the height, which is the vertical distance between a crest and trough; the wave length, which is the horizontal distance between a crest and trough; the period, which is the time that elapses during the passing of one wave length; the frequency, which is the number of waves that passed at a fixed point per unit of time; and the amplitude, which is half the height distance and equal to the energy of the wave.

There have been many attempts to harness and utilize energy produced by wave phenomena going back to the turn of the last century, such as the system disclosed in U.S. Pat. No. 597,833, issued Jan. 25, 1898. These attempts have included erecting a sea wall to capture energy derived from the wave phenomena; utilizing track and rail systems involving complex machinations to harness energy from wave phenomena; development of pump systems that are adapted only for shallow water wave systems; and construction of towers and the like near the sea shore where the ebb and flow of the tide occurs. Still other attempts have been made as well which are not described in detail herein.

Each of these systems is replete with problems. For example, certain systems which are adapted for sea water use are subjected accordingly to the harsh environment. These systems involve numerous mechanical parts which require constant maintenance and replacement, and therefore make the system undesirable. Other systems are limited to construction only at sea shore or in shallow water, which limit placement of the systems and therefore make the systems undesirable. Finally, other systems fail to use the full energy provided by the wave phenomena, and therefore waste energy through collection, resulting in an inefficient system.

Depletions in traditional energy sources, such as oil, have required the need for an efficient alternate sources of energy. The greenhouse effect, which is believed to be causes for such phenomena as global warming and the like, further establish the need for an environment-friendly energy creating device. The decline in readily available traditional fuel sources has lead to an increase in the costs of energy, which is felt globally. This adds yet another need for the creation of an environment-friendly, high efficiency, low cost energy device.

The need for readily available, cheaper sources of energy are also keenly felt around the world. In places such as China for example, rivers are being dammed up to create a large energy supply for a fast and growing population. Such projects can take twenty or more years to finish. The availability of the energy created by such a damming project does not even begin until completion of the project. Accordingly, there is yet another need for an energy device which provides energy immediately upon construction and has a short construction period.

SUMMARY OF THE INVENTION

The above identified problems and needs are solved by a buoyancy pump device driven by waves or currents according to the principles of the present invention. The buoyancy pump device includes a buoyancy block housing defining a buoyancy chamber therein through which the fluid may flow. A buoyancy block is disposed within the buoyancy chamber to move axially therein in a first direction responsive to rising of the fluid in the buoyancy chamber and a second direction responsive to lowering of the fluid in the buoyancy chamber.

A piston cylinder is connected to the buoyancy block housing and has at least one valve disposed therein operating as an inlet in response to movement of the buoyancy block in the second direction and an outlet in response to movement of the buoyancy block in the first direction. A piston is slideably disposed within the piston cylinder and connected to the buoyancy block, the piston being moveable in the first and second directions and responsive to movement of the buoyancy block in the second direction to draw a fluid substance into the piston cylinder through the at least one valve, and responsive to movement of the buoyancy block in the first direction to output the fluid substance through the at least one valve.

BRIEF DESCRIPTION OF THE DRAWINGS

A more complete understanding of the method and apparatus of the present invention may be obtained by reference to the following Detailed Description when taken in conjunction with the accompanying Drawings wherein:

FIGS. 4A-4C are side views of the buoyancy pump device of FIG. 1 as a wave passes through the buoyancy pump device;

DETAILED DESCRIPTION OF THE PRESENT INVENTION

To solve the problems identified above, a buoyancy pump device is provided to convert the potential energy that exists in the natural movement of very large volumes of water found in the form of, but not limited to, oceans, lakes, and rivers in the form of swells and waves into mechanical energy at a relatively high efficiency. The buoyancy pump device is adaptable to pump both gas and liquid, or combinations of both. As such and as referred to herein, gas is defined as both fluid or gas, thereby including both air and water. The pumped gas or liquid, as a mechanical energy source, may then be utilized to power turbines, air tools, ventilation, or any other mechanical devices using this form of power. The mechanical energy source may also be used for the creation of electrical energy utilizing similar mechanical conversion devices.

Figure 1:
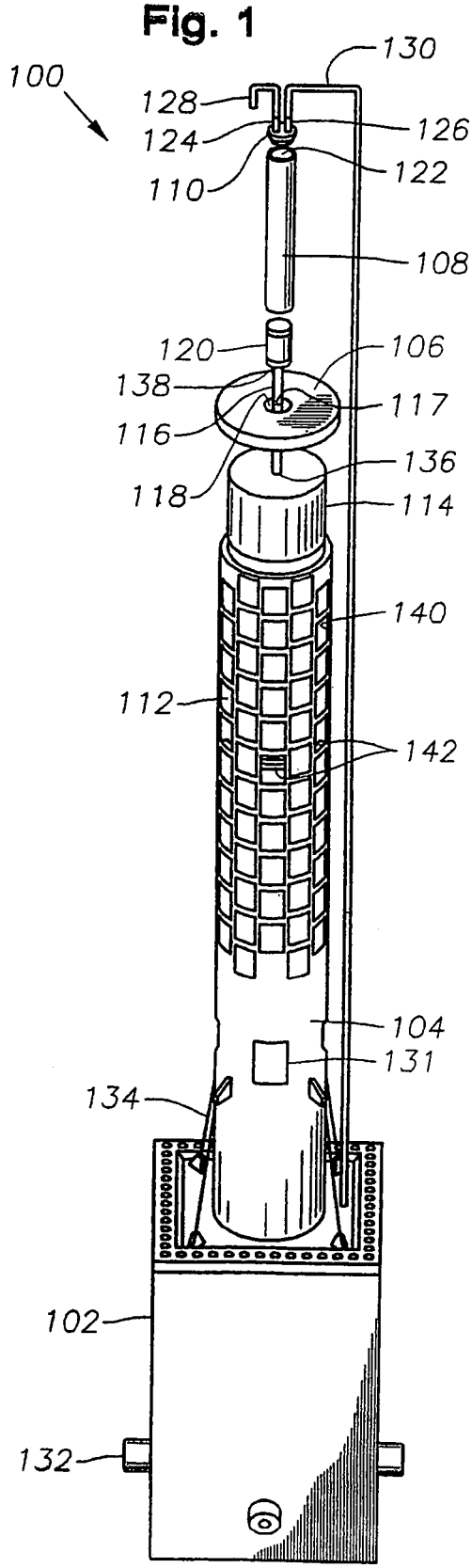
FIG. 1 is an exploded side-elevational view of a buoyancy pump device in a first embodiment in accordance with the principles of the present invention.
Figure 2B:
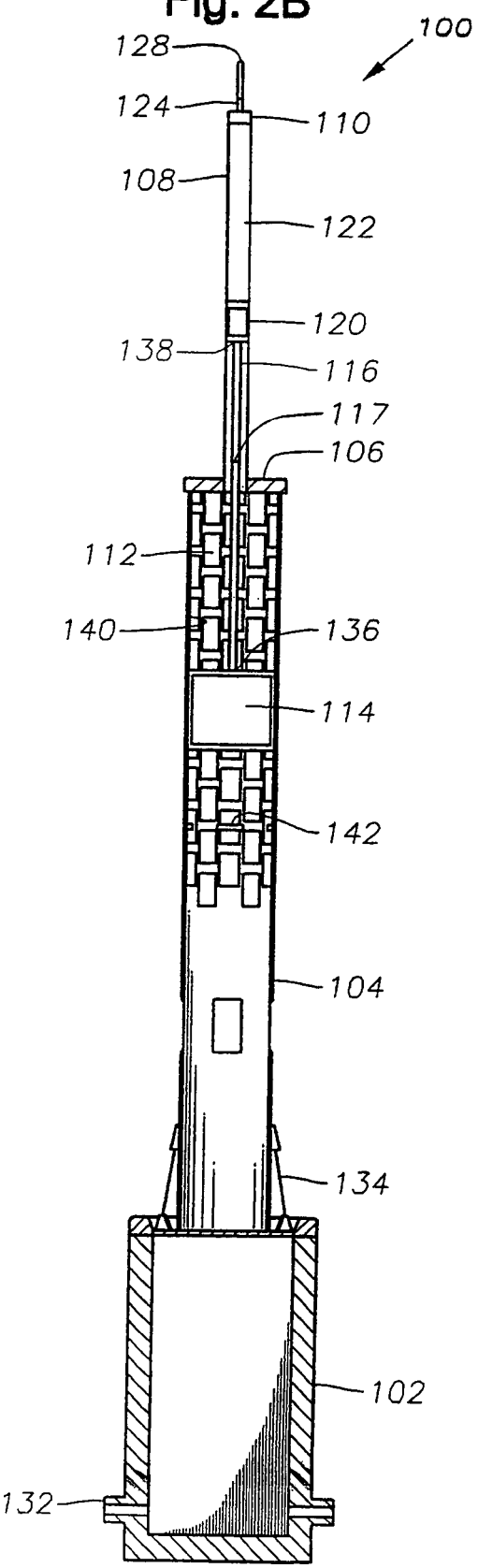
FIG. 2B is a cross-section of FIG. 2A taken along line 2B-2B.
Figure 2C:
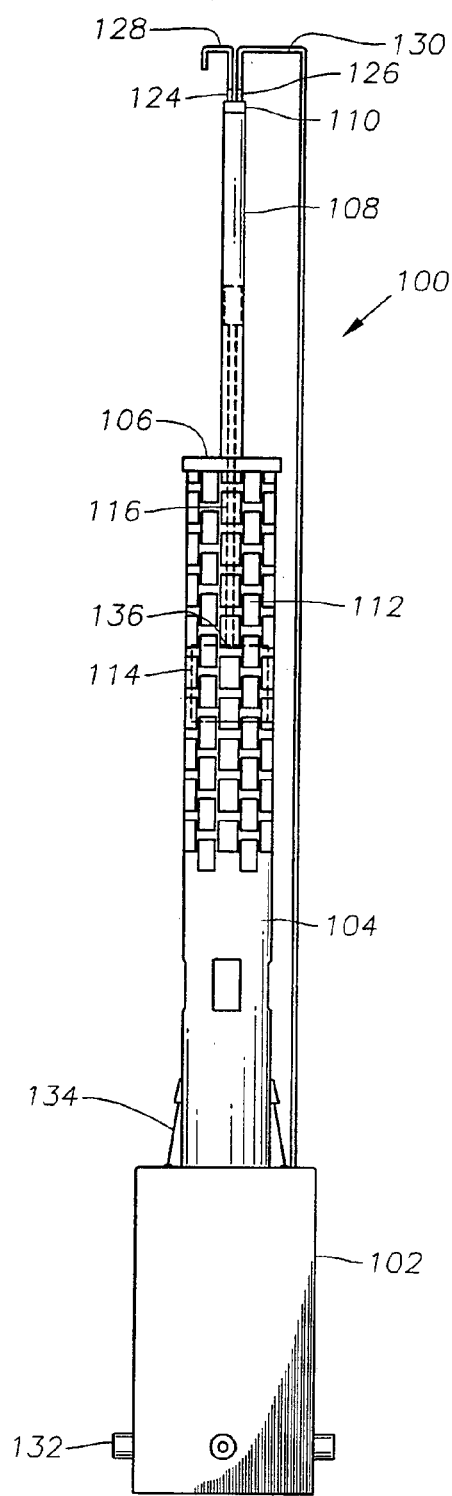
FIG. 2C is a side plan of the assembled buoyancy pump device of FIG. 1.
Figure 2A:
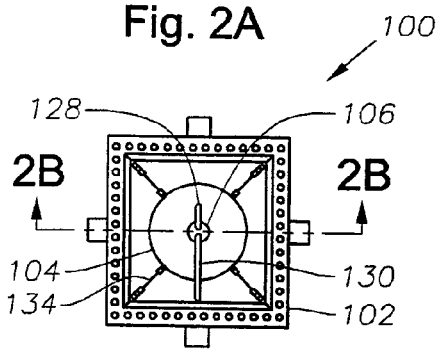
FIG. 2A is a top plan view of the buoyancy pump device of FIG. 1.

Referring now to FIG. 1 through FIG. 2C in combination, a buoyancy pump device 100 is shown in various views according to a first embodiment of the present invention. The buoyancy pump device 100 includes a base 102, a buoyancy cylinder 104 connected at one end to the base 102 and closed at the other end by a buoyancy cylinder cap 106, and a piston cylinder 108 connected at one end to the buoyancy cylinder cap 106 and aligned generally coaxially with the buoyancy cylinder 104. The other end of the piston cylinder 108 is closed by a piston cylinder cap 110. The buoyancy cylinder 104 is closed at one end by the upper surface of the base 102 and at the other end by the buoyancy cylinder cap 106 to define a buoyancy chamber 112 therein.

A buoyancy block 114 generally cylindrical in shape is slideably positioned within the buoyancy chamber 112 to move axially therein. A piston shaft 116 connected to the upper end of the buoyancy block 114 extends generally axially therefrom through an opening 118 in the buoyancy cylinder cap 106. A piston 120 generally cylindrical in shape is slideably positioned within the piston cylinder 108 and connected at the lower end to the other end of the piston shaft 116 to move generally axially therewith. The piston cylinder 108 is closed at one end by the upper surface of the piston 120 and at the other end by the piston cylinder cap 110 to define a piston chamber 122 therein.

An inlet valve 124 and an outlet valve 126 extend through the piston cylinder cap 110 in communication with the piston chamber 122 to allow gas or liquid to flow therethrough. An inlet line 128 and an outlet line 130 are connected to the inlet valve 124 and outlet valve 126, respectively, and are adapted to receive and exhaust, respectively, gas or liquid from the other ends. It will also be apparent to one of ordinary skill in the art that the operation of both the inlet and outlet valves could be performed by a single, multi-directional valve.

The base 102 may contain ballast for maintaining the buoyancy pump device 100 in a fixed position relative to the environment. The base 102 may also comprise a storage receptacle for the gas or liquid transferred therein which is connected to the outlet line 130 for receiving the air or liquid from the piston chamber 122. If the base 102 is to be used as storage, a base outlet 132 may be connected thereto to allow flow of gas or liquid to a desired location from the base 102. It is to be appreciated that the location of the base outlet 132 on the base 102 is adaptable such that the base outlet 132 may be placed anywhere on the base 102.

The buoyancy cylinder 104, which may also be a buoyancy block housing, may be connected to the upper surface of the base 102 by chains 134 that in turn are connected to the buoyancy cylinder 104. In this manner, the chains 134 stabilize the buoyancy cylinder 104 on the base 102. It is to be appreciated that guy wires or other connection means may be used to couple the buoyancy cylinder 104 to the base 102, and the present invention is not limited by the chains 134 as the connection means.

The buoyancy cylinder 104 may also have a plurality of regularly spaced openings on its perimeter to allow liquid such as water to flow through the buoyancy cylinder 104 surrounding the buoyancy block 114. To reduce turbulence associated with such flow, a plurality of turbulence openings 131 may be provided on the buoyancy cylinder 104. As such, the buoyancy cylinder 104 may comprise a cage or the like to reduce friction associated with gas flowing through the buoyancy cylinder 104.

The buoyancy cylinder 104 has a predetermined length. The length of the buoyancy cylinder 104 relates to movement of the buoyancy block 114 within different liquid environments. For example, when the buoyancy pump device 100 is placed in an ocean environment, the length of the buoyancy cylinder 104 needs to be adjustable to allow the buoyancy pump device 100 to perform with annual tide changes and wave heights. When the buoyancy pump device 100 is placed in a lake environment for example, the length of the buoyancy cylinder 104 would not require adjustment to wave height operational settings.

In another example, in a body of water having a 10 ft. water depth a buoyancy cylinder must be at least 10 ft., and have an additional 7 ft. operational height added to the 10 ft.

to allow movement of the buoyancy block within the buoyancy chamber. Accordingly, the buoyancy cylinder would be 17 ft. tall and has a 7 ft. usable stroke. But if the body of water has tide changes, this example changes slightly.

In the changed example, with the buoyancy pump device in a 10 ft. sea with a 2 ft. tide change results in a 2 ft. loss of usable stroke. To account for this change, the difference between the annual low tide and high tide is added to the length of the buoyancy cylinder to be deployed. That is, in an environment where maximum wave height is 7 ft., low tide is 10 ft., and high tide is 14 ft., the difference between low tide and high tide would be 4 ft. This is added to the buoyancy cylinder length (7 ft. (for maximum wave height) +10 ft. (to allow the buoyancy pump device to operate in low tide conditions) +4 ft. (difference between low and high tides)) for a total buoyancy cylinder length of 21 ft. This allows a 7 ft. stroke on high tide days with complete use of the passing waves.

The buoyancy cylinder cap 106 is adapted to support the piston cylinder 108 thereon, and the opening 118 therein is adapted to prevent liquid flowing into the buoyancy chamber 112 from entering the piston cylinder 108 therethrough. The buoyancy cylinder cap 106 may be connected to the buoyancy cylinder 104 by welding or threads, or other suitable connection means adapted to resist environmental forces while supporting the loads created by the piston cylinder 108 and its structural components. Seals may be used in the opening 118 of the buoyancy cap 106 to prevent liquids or gases from entering into the piston cylinder 108 from the buoyancy chamber 112. The piston cylinder 108 is adapted to seal the inside of the piston cylinder 108 from the environment. The piston cylinder 108 is constructed of material designed to limit the effects of the environment, including water in lakes, oceans, and rivers.

The buoyancy block 114 disposed within the buoyancy chamber 112 is generally cylindrical and has a tapered upper surface. The buoyancy block 114 has a predetermined buoyancy, such that the buoyancy block 114 moves in a cycle conforming to the fluid dynamics of the water in which the buoyancy pump device 100 is positioned and the hydraulic or pneumatic system characteristics of the buoyancy pump device 100 itself. The buoyancy of the buoyancy block 114 may likewise be adjusted depending on the characteristics and fluid dynamics of the water and the system. Such adjustment may occur by (1) manually or remotely adjusting the buoyancy block 114 either axially or radially with respect to the buoyancy chamber 112 or in both directions; and (2) adjusting other characteristics of the buoyancy block 114 affecting its behavior in the water. An exemplary adjustment means is described in greater detail below.

The piston shaft 116 is coupled to the buoyancy block 114 and the piston 120 via respective connection joints 136, 138. The connection joints 136, 138 may be designed to be movable or flexible in response to any radial motion of either the piston 120 or the buoyancy block 114 when the piston 120 and buoyancy block 114 are not axially aligned. Such movement or flexibility may be achieved through the use of a swivel-couple or other suitable coupling means.

The piston shaft 116 is designed to be lightweight and environmentally resistive, such that the piston shaft 116 continues to function after exposure to harsh environmental conditions. The piston shaft 116 is further designed to translate forces from the buoyancy block 114 to the piston 120 and from the piston 120 to the buoyancy block 114. Finally, the piston shaft 116 may be telescopically adjustable (as represented by a line 117), such that the length of the piston shaft 116 may be increased or decreased, depending on the requirements of the buoyancy pump device 100. The adjustment of the piston shaft 116 may be needed when air is the pumping media, or the height of waves or swells are less than desirable. Such adjustment enables maximum utilization of the potential energy in the waves or swells.

In order to seal the piston chamber 122, the piston 120 which is slideably positioned inside the piston cylinder 108 may include a seal therebetween extending around the perimeter of the piston 120. The seal is adapted to prevent seepage of gas or liquid from the environment into the piston chamber 122, or from the piston chamber 122 to the environment, while the piston 120 remains slidable within the piston chamber 122.

The inlet and outlet valves 124, 126 are unidirectional flow devices which permit the flow of gas or liquid into and out of the piston chamber 122, respectively. It is to be appreciated that the valves 124, 126 may be positioned at differing locations on the piston cylinder cap 110, so long as a desired pressure is achievable within the piston chamber 122.

Because movement of the buoyancy block 114 in the buoyancy cylinder 104 may be hampered by friction or other elements entering the buoyancy cylinder 104, a plurality of shims 140 may be connected to the inner surface of the buoyancy cylinder 104. The shims 140 axially extend along the perimeter of the buoyancy cylinder 104, and further serve to stabilize the orientation of the buoyancy block 114 within the buoyancy cylinder. The shims 140 may be constructed of a suitable material, such that the coefficient of friction between the shims 140 and the buoyancy block 114 approaches zero.

To limit axial movement of the buoyancy block 114 within the buoyancy cylinder 104, a plurality of stops 142 may be provided on the inner surface of the buoyancy cylinder 104 and disposed at a lower portion thereof. The positioning of the stops 142 may be adjusted to match a desired stroke length of the piston 120 within the piston cylinder 108.

It is to be understood that axial movement of the buoyancy block 114 in the buoyancy cylinder 104 translates to axial movement of the piston 120 within the piston cylinder 108 via the piston shaft 116. The piston shaft 116 and connection joints 136 further fix the position of the piston 120 with respect to the buoyancy block 114.

Figure 3A:
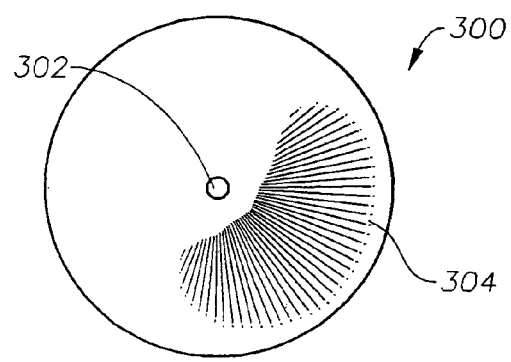
FIGS. 3A-3C are top plan, side, and isometric elevational views of an exemplary buoyancy block in accordance with the principles of the present invention.
Figure 3B:
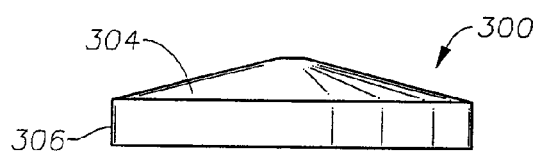
Figure 3C:
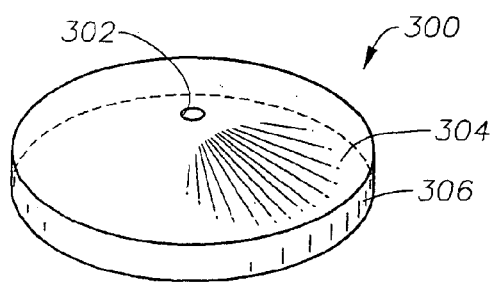

Referring now to FIGS. 3A-3C, an exemplary buoyancy block 300 is shown in top plan, side and isometric views, respectively. The buoyancy block 300 has an axial opening 302 adapted to receive the coupling joint 136 (FIG. 2B) and thereby couple to the piston shaft 116 (FIG. 1). An upper portion 304 is tapered radially inward from the perimeter of the buoyancy block 300, and terminates at the axial opening 302. The tapers on the upper portion 304 assist axial movement of the buoyancy block 300, especially when the buoyancy block 300 is submerged in water and is moving towards the surface of the water. Although the upper portion 304 is shown as separate from a lower portion 306 of the buoyancy block 300, it is to be appreciated that the tapers may begin from any portion of the buoyancy block 300 and terminate at the axial opening 302 to facilitate axial movement of the buoyancy block 300 in water.

Figure 3D:
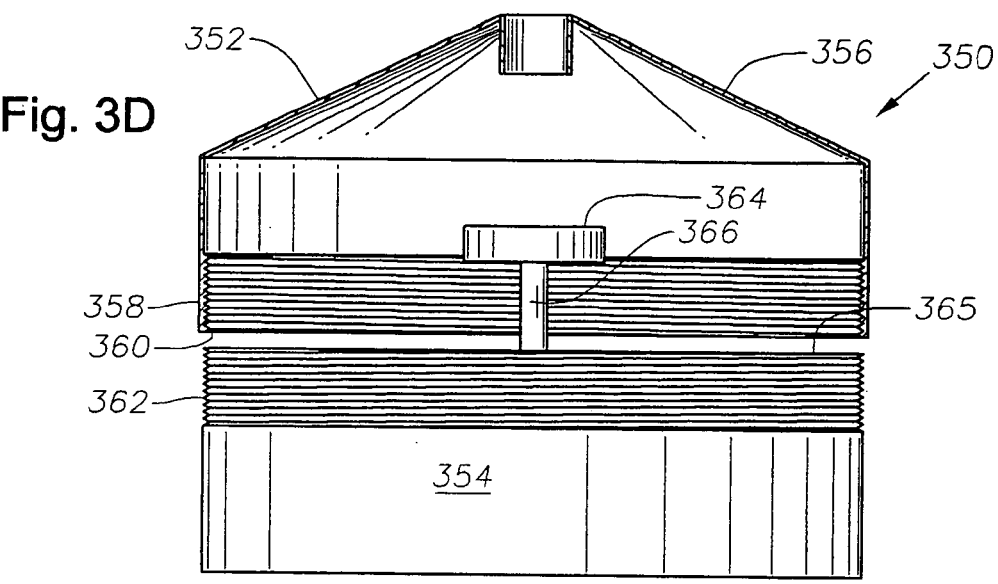
FIG. 3D is a partial cross-section of an exemplary buoyancy block having a telescoping portion.

Referring now to FIG. 3D, a partial cross-section of an alternative, exemplary buoyancy block 350 is shown. The buoyancy block 350 has an upper portion 352 and a lower portion 354. The upper portion 352 has a radially tapered portion 356 to facilitate axial movement of the buoyancy block 350 in water, and a non-tapered portion 358 connected to the tapered portion 356. Formed on the inner perimeter of the upper portion 352 of the buoyancy block 350 are threads 360.

The lower portion 354 of the buoyancy block is generally cylindrical, and has a plurality of threads 362 formed on the external perimeter of the lower portion 354. The threads 362 of the lower portion 354 are adapted to mate with the threads 360 of the upper portion 352 and allow axial movement of the lower portion 354 with respect to the upper portion 352.

Movement of the lower portion 354 with respect to the upper portion 352 is accomplished through the use of a motor 364. The motor 364 is connected to the lower portion 354 on an upper surface 365 of the lower portion 354. A drive shaft 366 couples the motor 364 to the upper surface 365 and rotates the lower portion 354 in a predetermined direction, thereby telescoping the buoyancy block 350. The telescoping of the lower portion 354 increases or decreases the height of the buoyancy block 350, thereby increasing or decreasing the buoyancy of the buoyancy block 350. It is to be appreciated that the diameter of the buoyancy block 350 is likewise adjustable using similar methods.

Figure 3E:
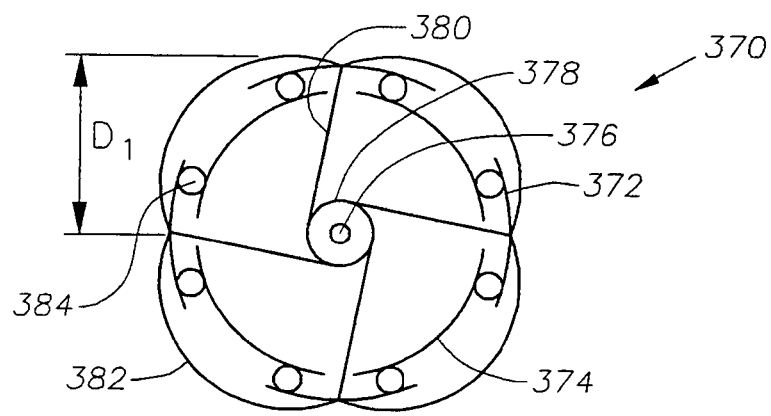
FIGS. 3E-3F are top plan views of an exemplary adjustable base portion of an exemplary buoyancy block in a contracted configuration and expanded configuration, respectively.
Figure 3F:
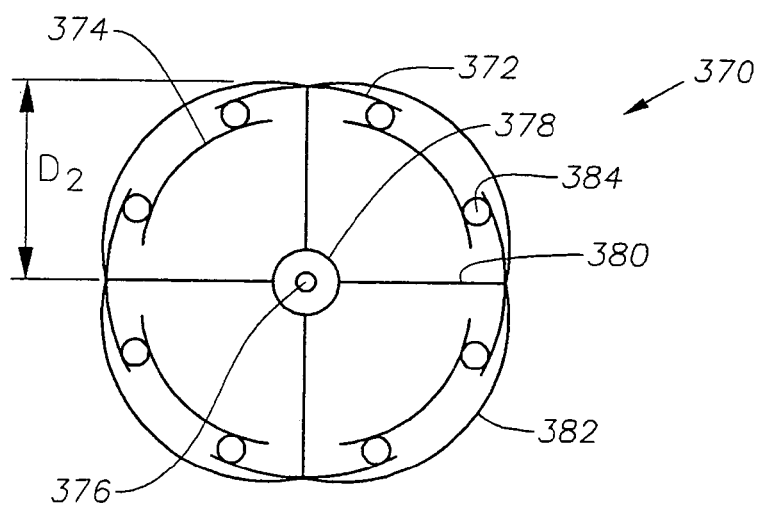

Referring now to FIGS. 3E and 3F in combination, a top view of an exemplary adjustable buoyancy block base 370 is shown. The adjustable buoyancy block base 370 includes outer plates 372, inner plates 374 connected to the outer plates 372, an axially disposed motor 376 connected to a gear 378, and a plurality of expansion bars 380 connected to the gear 378 and the outer plates 372. The circumference of the buoyancy block base 370 is sealed by plastic, thermoplastic or other sealant material 382, such as, for example, rubber. The sealant material 382 thus prevents environmental materials from entering into the buoyancy block base 370.

The outer plates 372 connect to the inner plates 374 via rollers 384. The rollers 384 allow movement of the outer plates 372 with respect to the inner plates 374. Guides for the rollers 384 may be positioned on respective surfaces of the outer and inner plates 372, 374.

The motor 376 is axially positioned within the buoyancy block base 370 and powered by a suitable power source. The motor 376 is connected to the gear 378, such that upon actuation of the motor 376, the gear 378 rotates in a clockwise or counter-clockwise direction.

The gear 378 is connected to the expansion bars 380, such that rotation of the gear 378 in a clockwise or counter-clockwise direction results in respective expansion or contraction of the diameter of the buoyancy block base 370 through the movement of the outer plates 372 with respect to the inner plates 374 via the rollers 384.

For example, FIG. 3E shows the buoyancy block base 370 in a contracted position having a diameter delineated by $D_1$. When the motor 376 is actuated to rotate the gear 378 in a clockwise direction, the expansion bars 380 correspondingly rotate to thereby expand the diameter of the buoyancy block base 380 as shown in FIG. 3F and delineated by $D_2$. The thermoplastic material 382 likewise expands in relation to the expansion of the buoyancy block diameter. Accordingly, the buoyancy block base 370, when used in a buoyancy pump device, may radially expand or contract to increase or decrease the diameter of the associated buoyancy block.

It is to be appreciated that, although shown in a generally cylindrical configuration, the buoyancy block base 370 may be in other configurations depending on the design and requirements of the buoyancy pump device.

Figure 4D:
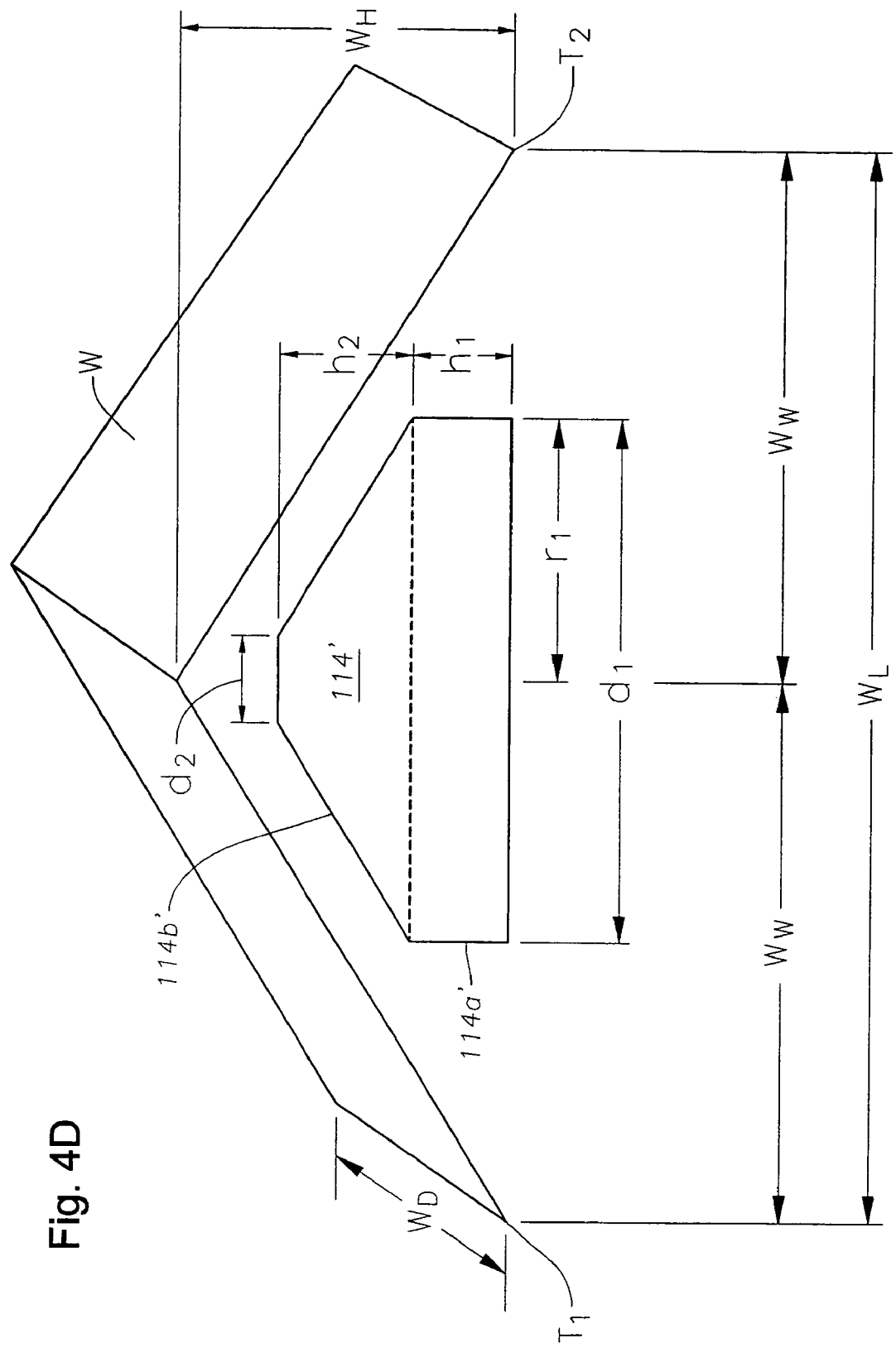
FIG. 4D is a schematic illustration of an exemplary wave.

Referring now to FIGS. 4A, 4B and 4C, the buoyancy pump device 100 is shown in various positions as a wave (W) passes through the buoyancy chamber 112 (FIG. 1). The waves (W) passing through the buoyancy pump device 100 have geometric characteristics including the following:

Wave height ($W_H$) is the vertical distance between the crest (C) or high point of the wave and the trough (T) or low point of the wave;

Wave length ($W_L$) is the distance between equivalent points, e.g., crests or troughs, on the waves; and Stillwater level ($S_{WL}$) is the surface of the water in the absence of any waves, generally the midpoint of the wave height ($W_H$).

In FIG. 4A, the buoyancy block 114 is shown at its highest vertical position supported by the crest ($C_1$) of the wave (W) as fluid is output through the outlet valve 126. As the wave (W) travels through the buoyancy chamber 112 by a distance of about one-half (½) the wave length ($W_L$) as shown in FIG. 4B, the buoyancy block 114 falls to its lowest vertical position within the trough (T) of the wave (W) as fluid is drawn through the inlet valve 124. In FIG. 4C, the wave (W) has traveled the full wave length ($W_L$) so that the buoyancy block 114 has returned to the highest vertical position on the following crest ($C_2$) and fluid is again output through the outlet valve 126.

The piston stroke ($P_S$) of the buoyancy pump device 100 is defined as the distance the piston 120 is moved by the buoyancy block 114 as the wave (W) travels one wave length ($W_L$) through the buoyancy chamber 112, which cause the buoyancy block 114 to drop a distance ($B_D$) equal to the wave height from the crest ($C_1$) position in FIG. 4A to the trough (T) position in FIG. 4B, and then rise the same distance ($B_R$) from the trough (T) position in FIG. 4B to the crest ($C_2$) position in FIG. 4C. Hence, the piston stroke ($P_S$) equals twice the wave height ($W_H$):

$$P_s = B_D + B_R = 2W_H$$

Thus, the piston 120 has a "half stroke" descending and a "half stroke" rising, also referred to as the "dropping stroke" and "lifting stroke", respectively.

The wave has a given wave height $W_H$ and period $W_P$ as it passes through the buoyancy pump device 100 the buoyancy pump device 100 has a piston stroke $P_S$, which is defined by the piston moving across one full wave period $W_P$. As can be seen in FIG. 4A, as a wave moves from across the buoyancy pump device 100, the buoyancy block moves in direct association with the passing wave.

When the buoyancy pump device 100 is in a zero-pressure state, the buoyancy block 114 is able to travel the maximum distance resulting from the wave motion, i.e., $P_{smax} = 2W_L$. This translates into a full half-stroke travel of the piston 120 in the piston cylinder 108, which forces fluid out of the piston chamber through the valve.

Referring back to FIG. 1 and in operation, after the buoyancy pump device 100 has been placed initially in a body of water, such as an ocean, lake, river, or other wave- or swell-producing environment, the initial pressure in the outlet line 130, outlet valve 126 and piston chamber 122 begins at a zero-pressure state. A wave, having recognized properties, arrives at the buoyancy pump device 100. Water from the wave incrementally fills the buoyancy chamber 112. As the water fills the buoyancy chamber 112, the buoyancy block 114 begins to rise with the rising water in the buoyancy chamber 112.

The buoyancy of the buoyancy block 114 is designed such that a majority of the buoyancy block 114 rides relatively high out of the water within the buoyancy chamber 112, thereby allowing axial movement of the buoyancy block 114 within the buoyancy chamber 112. As the wave departs, the buoyancy block 114 lowers with the settling water in the buoyancy chamber 112 and by gravity. The piston shaft 116 translates the movement of the buoyancy block 114 to the piston 120.

At the other end of the spectrum, when the buoyancy pump device 100 starts with maximum pressure in the outlet line 130 and outlet valve 130, a majority of the buoyancy block 114 will be virtually submerged within the water in which the buoyancy pump device 100 is placed. This results in a decreased stroke-length of the piston 120 through the piston chamber 122.

Gravity powers the down stroke of the buoyancy block 114 and the piston 120 as a given wave or swell passes. With the rise of a given wave or swell, the buoyancy of the buoyancy block 114 provides the lift/power for the piston 120 via the piston shaft 116. When piston 120 pressure from the outlet valve 126 is low, the buoyancy block 114 rides relatively high in the water within the buoyancy chamber, because the buoyancy lift required is only relative to the back pressure delivered into the piston chamber 122 via the outlet valve 126.

When the piston pressure is high, the axial movement of the buoyancy block 114 within the buoyancy chamber is limited, resulting in the buoyancy block 114 riding lower in the water. In certain high pressure states in the piston chamber 122, the buoyancy block 114 may be almost completely submerged and still axially move within the buoyancy chamber to pump the liquid or gas within the piston chamber 122. Eventually, the pressure from the outlet valve 126 may become so great that the buoyancy of the buoyancy block 114, even when completely submerged, can no longer provide enough lifting force to move the piston 120. At this point, the buoyancy block 114 and piston 120 cease movement even as the wave or swell continues to rise with respect to the buoyancy pump device 100.

For example, in a buoyancy pump device having a buoyancy block with a one foot height deployed in a maximum pressure situation, the buoyancy pump device will lose about one foot of pump stroke within the piston cylinder. Should a wave of only one foot be present, the buoyancy pump device will not pump.

Should this point not be reached, the buoyancy block 114 and piston 120 will continue to axially move with the rise of a given wave or swell until the wave or swell reaches its respective maximum height, allowing the piston 120 to move the liquid or gas in the piston chamber 122 through the outlet valve 126. This process is maintained until the maximum compression point in the piston chamber 122 is reached but still allowing outward flow.

When the buoyancy block 114 is almost submerged or submerged yet still axially moving, this is termed the high waterline of the buoyancy pump device 100. As the wave or swell passes, the lowest point of descent of the buoyancy block 114 is termed the low waterline of the buoyancy pump device 100. The distance between the high waterline and low waterline determines the power stroke of the piston 120.

For example, when gas is the media to be pumped, the inlet line 128, which may be adjusted to connect to a gas source, is placed in a location that communicates with and receives gas from a gas environment such as ambient air. The outlet line 130 may be connected to the base 102 for storing the compressed gas. It is to be appreciated that the outlet line 130 may be connected to another location for storing the gas, such as a fixed storage tank that is located external the buoyancy pump device 100.

In the gas example, when the piston 120 lowers with a settling wave, it creates a vacuum in the piston chamber 122, and draws gas through the inlet line 128 and the inlet valve 124 into the piston chamber 122. At the trough of the wave and after the water has evacuated the buoyancy chamber 112, or when the buoyancy block 114 contacts the stops 142 which inhibits further downward movement of the buoyancy block 114 and piston 120, the maximum amount of gas fills the piston chamber 122.

As the wave begins to rise and water incrementally fills the buoyancy chamber 112, the buoyancy block 114 is exposed to and contacted by the water. The buoyancy of the buoyancy block 114 results in a natural lift of the buoyancy block 114 in response to the rising water within the buoyancy chamber 112. Due to the fixed position of the buoyancy block 114 with respect to the piston 120 as facilitated by the piston shaft 116, the piston 120 rises in direct relation to the lifting of the buoyancy block 114.

The gas that has been introduced into the piston chamber 122 compresses within the piston chamber 122 as the buoyancy block 114 rises, until the pressure of the compressed gas overcomes the line pressure in the outlet line 130. At this point, the gas flows through the outlet valve 126 and the outlet line 130 and is transported to a desired location for use or storage, for example the exemplary base 102 describe above or other storage location. It is further conceivable that the gas may be dispelled into the atmosphere should the situation require.

Upon the wave reaching its maximum height as it passes through the buoyancy pump device 100, water begins to exit the buoyancy chamber 112. Gravity urges the buoyancy block 114 downward with the wave, resulting in a downward movement of the piston 120, which creates a vacuum in the piston chamber 122. The vacuum again draws gas into the piston chamber 122 as described previously, thereby repeating the process with each successive wave, thereby driving the buoyancy pump device 100 to successively and cyclically draw gas into the piston chamber 122, compress gas within the piston chamber 122, and force gas from the piston chamber 122 into the base 102. The piston 120 further compresses the gas stored in the base 102 with each cycle until the buoyancy block 114 can no longer overcome the pressure of the stored gas and in the outlet line 130. At this point, the buoyancy block 114 no longer rises with respect to the waves.

In another example, when a liquid is the media to be pumped, the inlet line 128 is connected to a liquid environment such as water. The outlet line 130 may be connected to a storage reservoir, including but not limited to a lake bed, water tower, or other water system. When incompressible liquids such as water are being pumped, the piston shaft 116 may not require adjustment because the buoyancy pump device 100 will pump once the piston chamber 122 is completely filled with the incompressible liquid.

In the liquid example, the lowering of the piston 120 correspondingly creates a vacuum in the piston chamber 122, which draws water through the inlet line 128 and inlet valve 124 and into the piston chamber 122. At the trough of the wave and when water evacuates the buoyancy chamber 112, or when the buoyancy block 114 contacts the stops 142 that inhibit further downward movement of the buoyancy block 114, the maximum amount of liquid fills the piston chamber 122.

As the wave begins to rise and water incrementally fills the buoyancy chamber 112, the buoyancy block 114 is exposed to and contacted by the water. The buoyancy of the buoyancy block 114 results in a natural lift of the buoyancy block 114 in response to the incrementally rising water within the buoyancy chamber 112. Due to the fixed nature of the buoyancy block 114 with respect to the piston 120 as facilitated by the piston shaft 116, the piston 120 incrementally rises in direct relation to the lifting of the buoyancy block 114. In the case of water as the media, the rising incompressible water within the piston chamber 122 overcomes the line pressure in the outlet line 130. At this point, the water flows through the outlet valve 126 and the outlet line 130, and is transported to a desired location for use or storage. It is conceivable that the liquid and/or gas may be dispelled into the atmosphere should the situation require.

Upon the wave reaching its maximum height as it passes through the buoyancy pump device 100, and departs, water begins to incrementally exit the buoyancy chamber 112. Gravity urges the buoyancy block 114 downward, resulting in a downward movement of the piston 120 and a vacuum in the piston chamber 122. The vacuum serves to draw liquid and/or gas into the piston chamber 122. The process is repeated with each successive wave, thereby driving the buoyancy pump device 100 to successively and cyclically draw liquid and/or water into the piston chamber 122, and pump the liquid and/or water from the piston chamber 122.

It is to be appreciated in the liquid example that a loss of buoyancy lift must be factored due to the weight of the water/liquid present within the piston chamber 122. However, in the gas example, because of the relatively lightweight properties of the gas vs. the liquid, this loss is virtually non-existent. The loss in the liquid example may be overcome through the adjustable properties of the buoyancy block 114.

The operation of the buoyancy pump device 100 depends on the environment where it is to be used. For example, when the buoyancy pump device 100 is situated in an ocean having predetermined annualized wave averages, the buoyancy pump device 100 must be coupled to a structure relative to the waves, or positioned with ballast such that the buoyancy pump device maintains its relative position to the waves. Such structures could be fixed or substantially fixed, or could include a seaworthy vessel, a platform-type arrangement, or direct coupling of the buoyancy pump device 100 to the ocean floor. Such connections are common, especially within the oil and gas industry, and are contemplated to be used in conjunction with the novel buoyancy pump device 100 according to the principles of the present invention.

The buoyancy lift for driving the piston within the piston cylinder via the piston shaft is directly related to the buoyancy block's lift capability. Theoretically, for example, given a total displacement of the buoyancy block at 100 lbs., subtracting the buoyancy block weight (10 lbs.), piston shaft, connectors, other miscellaneous parts (5 lbs.), and the piston weight (2.5 lbs.) from the total displacement (100 lbs.) leaves a lift capability of 82.5 lbs. Empirical testing of the buoyancy pump device 100 operates about 96% efficient to this formula.

It is contemplated that the buoyancy pump device 100 may be used to self-calibrate its position with respect to the ocean floor and thereby maintain a generally stable position relative to the wave environment in which it is placed. For example, ballast tanks may be coupled to the buoyancy pump device 100 and filled with appropriate ballast. The buoyancy pump device 100 may pump gas or liquid into the ballast tanks and thereby adjust the position of the buoyancy pump device 100 relative to the wave environment. Such a configuration may be accomplished by coupling the outlet line 130 of the buoyancy pump device 100 to the ballast tank and providing a control system to adjust flow into and out of the ballast tank upon a predetermined condition. Both gas and liquid may be used depending on the desired location adjustment of the buoyancy pump device 100.

It is also contemplated that the length and width (diameter) of the piston 120 may be adjusted to correspond to the pumping media or the properties of the piston 120, the buoyancy chamber 112, and the buoyancy block 114. Likewise, the piston 120 may have a telescopic adjustment or the like thereon for adjusting the height or width of the piston 120 similar to the buoyancy block 300 (See FIGS. 3A-3C).

For example, flow rates and pressure settings within the buoyancy pump device 100 are related to the inside diameter and height of the piston cylinder 108. The larger the piston cylinder 108 and the longer the piston stroke within the piston cylinder 108, the greater amount of liquid or gas flow is accomplished with the least pressure present. The smaller the piston cylinder 108 and the shorter the piston stroke within the piston cylinder 108, the greatest pressure is present to the liquid or gas flow and the least amount of liquid or gas flow is accomplished.

It is recognized that friction losses may occur, even though modest, as related to the lengths and dimensions of the inlet line 128 and outlet line 130 and other materials including the inlet and outlet valves 124, 126.

The size of the buoyancy chamber 112 and buoyancy block 114 may also be adjusted to provide for maximum buoyancy pump device efficiency. Such adjustments may be made, for example, manually, by interchanging parts, automatically, by including telescoping portions on the respective component, or remotely, by configuring a control system to adjust the properties of the desired component. In this manner, the buoyancy pump device 100 may be calibrated to function on waves having varying properties, such that the buoyancy pump device 100 may take advantage of large waves, small waves, and waves having more moderate properties.

To take advantage of these waves, the buoyancy pump device 100 does not necessarily have to be secured to the base 102. Rather, the buoyancy pump device may be, for example, mounted to the floor of the body of water, secured to a structure mounted on the floor of the body of water, secured to a rigid floating platform, secured to a sea wall, or other mounting locations that provide a stable platform or its equivalent.

The size of the buoyancy pump device 100 and the function of the buoyancy pump device 100 related to the amount of energy in the wave or swell may be determined by several factors. For example, these include: the annual high, low and average wave size; the annual high, low and average tide marks; the average period of the wave or swell; the depth of liquid at the location of the wave or swell; the distance from shore to the wave or swell; the geography of the near vicinity of the wave or swell location; and the structure of the buoyancy pump device 100. It is contemplated that the buoyancy pump device 100 may be used in combination with other buoyancy pump devices in a grid fashion to pump larger volumes of gas or liquid through the pumps.

To determine the horsepower generated from a given wave height and velocity, the wave horsepower (potential energy) and the buoyancy block horsepower in falling and lifting configurations were calculated. From this data, the piston pumping horsepower was then calculated for both water and air pumping configurations. These calculations are described below according to an exemplary testing configuration.

Wave Horsepower

Referring more specifically to FIGS. 4A-4D, wave horsepower (Wave HP) is determined for a wave (W) traveling over a distance of one-half the wave length ($\frac{1}{2}W_L$) as follows:

Wave HP=$[(W_v)(D)/(HP)](W_S)$ where $W_V$(Wave Volume)=$(W_w)(W_D)(W_H)$(gallons water/ft³)

$W_w$=Wave Width ($\frac{1}{2}W_L$)=17.5 feet $W_D$=Wave Depth=17.5 feet $W_H$=Wave Height=5 feet and $D$=density of water (8.33 lbs/gal)

and

HP=horse power unit (550)

and $W_S$=Wave Speed ($\frac{1}{2}W_L/W_T$)

and $W_T$=Wave time to travel $\frac{1}{2}W_L$ (7.953 sec).

For example, the wave depth ($W_D$) is assumed to be equal to the wave width ($W_W$) so that the profile of the wave (W) will completely cover the buoyancy block 114' which is cylindrical in shape. For the numbers indicated above which are exemplary, the calculations are as follows:

Wave HP=[(11,453 gal)(8.33 lbs/gal)/(550)](2.2 ft/sec)=382 where $W_V$=(1,531 ft³)(7.481 gal/ft³)=11,453 gal; and $W_S$=(17.5 feet)/(7.953 sec)=2.2 ft/sec.

Buoyancy Block Dropping HP

As the wave (W) travels through the buoyancy chamber 104 during the dropping stroke (FIGS. 4A and 4B), the buoyancy block 104 drops with gravity into the trough (T). The buoyancy block horsepower generated during the dropping stroke ($BB_D$) can be determined from the following equation:

$BB_D$=$[(BB_V)(D)(WR)/\text{HP}](DS_S)(TR_D)$ where $BB_V$ (Buoyancy Block Volume)=$(VB+VC)$(7.48 gal/ft³)

VB=Volume of Base 114'a=$\pi r_1^2 h_1$

VC=Volume of Cone 114'b=$\pi/2(r_1+r_2)^2 h_2$ and $D$=density of water (8.33 lbs/gal)

such that, $(BB_V)(D)$=the displacement weight of the buoyancy block 114' and

WR=Weight ratio of water to the buoyancy block 114' material and

HP=horsepower unit (550)

and $DS_S$=Dropping Stroke Speed=$B_D/T_D$ $B_D$=distance of stroke travel when dropping and $T_D$=time to travel distance $B_D$ and $TR_D$=Time Ratio, i.e., percentage of time buoyancy block drops during a wave period=50% assuming symmetrical long waves.

Continuing with the exemplary data set forth above for the Wave HP calculations, the calculations for $BB_D$ are as follows:

$BB_D$ = [4,186 gal)(8.333 gal/ft³)(0.10)/550](0.25 ft/sec)(0.5)

= 0.79 (HP available from Dropping Stroke of Buoyancy Block)

where $BB_V$ = $[\pi(17.5)^2(1.5) + (\pi/2)(17.5 + 1.75)^2(2)]$(7.48 gal/ft³)

= (361 ft³ + 199 ft³)(7.48 gal/ft³)

= (560 ft³)(7.48 gal/ft³) = 4,186 gal and $DS_S$ = (1.00 ft)/(3.976 sec) = 0.25 ft/sec and $(BB_V)(D)$ = 34,874 lbs (total displacement)

and $(BB_V)(D)(WS)$ = 3,487 (usable weight)

Buoyancy Block Lifting Horsepower

As the wave (W) continues traveling through the buoyancy chamber 104 during the lift stroke (FIGS. 4B and 4C), the buoyancy block 104 rises with the wave until it peaks at the crest ($C_2$). The buoyancy block lifting horsepower generated during the lift stroke ($BB_L$) can be determined from the following equation:

$BB_L$ = $[(BB_V)(D)(1 - WR)/\text{HP}](LS_S)(TR_R)$ where $LS_S$ = Lifting Stroke Speed = $B_R/T_R$ $B_R$ = distance of stroke travel when rising = 1 ft.

$T_R$ = time to travel distance $B_R$ = 4.0 sec and

-continued $TR_R$ = Time Ratio, i.e., percentage of time buoyancy block rises during a wave period
= 50% assuming symmetrical long waves.

$(BB_V)(D)(1 - WR)$ = Usable weight during lifting stroke ($UW_L$)
= 31,382 lbs such that $BB_L = [(31,382 \text{ lbs})/550](1 \text{ ft}/4.0 \text{ sec})(0.5) = 7.13$ HP

Total Input Horsepower

Accordingly, the total amount of input horsepower withdrawn from the wave by the buoyancy block($BB_T$)is as follows:

$BB_T = BB_D + BB_L$

Using the above-exemplary numbers set forth above, the total input power for the buoyancy block 114' is as follows:

$BB_T = 0.79 + 7.13 = 7.92$ HP.

Piston Pumping Power (CFM/PSI)

The piston pumps water at a given rate in cubic feet per minute (CFM) and a given pressure in lbs. per square inch (PSI) for each half (½) stroke when the buoyancy pump device is configured to pump water according to the following formulae:

$BF$=Piston Water flow=$(S_v)(SPM)(BP_{eff})$ where $S_v$=Volume per ½stroke=$(\Pi)(\text{piston radius})^2(\text{stroke length})$=3.464 and $SPM$=Strokes per minute=7.545 and $BP_{eff}$=Empirical Tested Efficiency of Exemplary Buoyancy Pump Device=83%.

For the exemplary numbers indicated above, the water flow from the pump is 21.7 CFM.

The determination of the piston water pressure (PSI) for each half (½) stroke in the buoyancy pump device (BP) is made by the following equation:

$BP = \{W_L - [(S_V)(D)(\text{gallons water/ft}^3)]\}/SA_P$ where $UW_L$=usable weight during a lift stroke=31,386 lbs $S_V$=Volume per ½stroke=$(\Pi)(\text{piston radius})^2(\text{stroke length})$=3.46 ft$^3$ $D$=density of water (8.33 lbs/gal)

and $SA_P$=Surface Area of the Piston (in$^2$)=498.76.

Accordingly, for the above-exemplary numbers, the PSI/stroke for the exemplary buoyancy pump device is (31,386 lbs.–215.84 lbs)/498.76 in$^2$=62.50 PSI/Stroke.

Usable Generator Produced HP

When the exemplary buoyancy pump device in a water-pumping configuration is connected to an exemplary water storage tank for use in powering an exemplary water turbine, the following empirical formula is used to measure power produced by the buoyancy pump device:

HP=$\{(BP)(BP_{eff})(\text{Head})-[(\text{Loss})(\text{Head})(\text{Pipe Ft./Section})]\}(BF)(T_{eff})(\text{KW})(\text{HP})$ where $BP_{eff}$=Empirically tested buoyancy pump efficiency=88%

Head=PSI to Head(ft) conversion factor=2.310

Loss=Pipe loss efficiency factor=0.068

Pipe Ft./Section=One pipe has a length of 100 ft., and 10 pipes=1 section of pipe such that 1 mile of pipe=5.280 sections of pipe $T_{eff}$=Turbine efficiency based on existing water turbine=90%

KW=Conversion factor for ft/sec to KW32 11.8

HP=Conversion factor for Watts to HP=746

Accordingly, using the above-exemplary numbers in combination with the prior calculations, the output HP for an exemplary power system utilizing the buoyancy pump device is as follows:

HP=$\{[(62.5)(0.88)(2.310)]-[(0.068)(2.310)(10)(5.280)]\}(21.689/60)(0.9/11.8)(1000/746)=4.389$.

Input HP V. Output HPEfficiency

Accordingly, the conversion efficiency of input HP to output HP is determinable according to the following:

Conversion Efficiency=HP/$BB_T$=4.389/7.972= (0.5505)(100)=55.05%.

Thus, using empirical and theoretical data, it is appreciated that the exemplary buoyancy pump device according to the principles of the present invention, when used in conjunction with an exemplary water turbine, has about a 55% conversion efficiency of the HP withdrawn from a passing wave to output HP, which may then be used as a source of power.

The above-exemplary calculations were made with an exemplary buoyancy block 114' having a fixed diameter ($d_1$)_or width depending on the geometry of the buoyancy block 114'-and height ($h_1+h_2$). It is to be appreciated that the wave height ($W_H$) will vary for different locations and for different times during the year at each location. Thus, it is desirable to reconfigure or adjust this buoyancy block based on the varying wave characteristics. To ensure high efficiencies, the height and/or diameter of the buoyancy block 114' can be adjusted. For example, the buoyancy block 114' can be designed or adjusted to increase the height of its base 104'*a* (h1) and related diameter to accommodate waves having a greater wave height ($W_H$) as will be described below.

If a given wave (W) has the same wave period ($W_P$) as above and a wave height increased to 9 ft. from 5 ft., with all remaining wave properties as described above, the buoyancy block height is adjusted, for example, by 1.5 ft. to increase the buoyancy pump device performance in the larger $W_H$. Adjustment to the buoyancy block as described herein will be referred to as 'warp'. Assuming also that the stroke speeds are the same ($DS_S=LS_S$) and referred to as the same value ($S_S$), the following calculations apply:

Wave HP=$[(W_V)(D)/(\text{HP})](W_S)$=687.35 and $S_S$=0.880 ft/s $BB_D=\{[(BB_{v1})(7.481 \text{ gal/ft}^3)(8.33 \text{ lbs/gal})(0.10)]/550\}(0.880)(0.5)$=2.789 HP where $BB_{v1}$=559.630 ft$^3$ and $BBL=[(BB_{v2})(7.481 \text{ gal/ft}^3)(8.33 \text{ lbs/gal})](0.9)(0.88)(0.5)/550$=41.297 HP where $BB_{v2}$=920.423 ft$^3$ $S_v$=12.122 ft$^3$ and

BF=75.912

BP=106.494

HP=26.93 HP such that

Conversion Efficiency=$[(26.93)/(2.789+41.297)](100)$=61.08%

The number used for buoyancy block volume in the dropping configuration ($BB_{v1}$) is the same number used in the earlier non-warped buoyancy block example. This is because the weight for the warped buoyancy block remains constant. However, the buoyancy block volume in the lifting configuration ($BB_{v2}$) increases due to the increased area of the buoyancy block as a result of the warp. Accordingly, it can be seen that increasing the buoyancy pump height by 1.5 ft. results in a larger amount of horsepower in the lifting and dropping of the buoyancy block, and a larger amount of output horsepower in the exemplary turbine system with improved overall efficiency.

TABLE 1

| WAVE HEIGHT ($W_H$) | | Buoyancy Block Diameter | BUOYANCY BLOCK HP ($BB_T$) | |
|---|---|---|---|---|
| Low | High | (in) | Low Wave (3 mph) | High Wave (8 mph) |
| 3 | 12.6 | 126 | 0.9 | 26.9 |
| 4 | 16.8 | 168 | 2.21 | 64.76 |
| 5 | 21 | 210 | 4.39 | 126.94 |
| 6 | 25.2 | 252 | 7.67 | 219.88 |
| 7 | 29.4 | 294 | 12.28 | 349.77 |
| 8 | 33.6 | 336 | 18.45 | 522.78 |
| 9 | 37.8 | 378 | 26.39 | 745.09 |
| 10 | 42 | 420 | 36.33 | 1022.9 |

Data for TABLE 1, which shows the amount of horsepower produced by a buoyancy pump device according to the present invention, was generated based on a wave having the indicated wave height and moving at 3 miles per hour for the low wave height, and 8 miles per hour for the high wave height. The diameter or width of the buoyancy block was adjusted to perform in larger wave environments as indicated and described above. The equations set forth above were used to calculate the horsepower for the low and high wave settings.

Because waves or swells are the source of potential energy for the buoyancy pump device, it is to be appreciated that the lack of waves or swells results in no production by the buoyancy pump device. Accordingly, no data was obtainable in this condition.

The larger and faster the wave, swell or current, the greater the potential energy available for extraction through the buoyancy pump device. Likewise, the larger the buoyancy block, either in height or diameter, the greater the potential energy available for extraction from the water. The smaller and slower the wave, swell or current, the smaller the potential energy available for extraction from the water through the buoyancy pump device. Similarly, the smaller the buoyancy block, the smaller potential energy available for extraction from the water.

To achieve the greatest amount of potential energy available from the buoyancy pump device 100, the dimensions of the buoyancy block 114 must, in a fully submerged state, not exceed the width or height of the wave or swell arc or height, thereby allowing the virtually submerged buoyancy block 114 to axially move at least a small amount.

In Table 1, the buoyancy of the buoyancy block in the buoyancy pump device was varied by adjusting the width or diameter of the buoyancy block in the amount indicated to maximize the efficiency of the buoyancy pump device with respect to the varying wave heights.

To determine operational days for the buoyancy pump device using empirical ocean wave data, several sources are available. For example, relevant wave data over a given period of time is determinable from http://www.ndbc.noaa.gov. The following table illustrates wave data for January 2001 and February 2001 taken from GRAYS HARBOR, Wash.

TABLE 2

| Annualized Wave Averages Grays Harbor, WA Buoy (125.99 feet) | | | | | |
|---|---|---|---|---|---|
| January 2001 | | | February 2001 | | |
| Day | Wave Height (ft.) | Period (sec) | Day | Wave Height (ft.) | Period (sec) |
| 1 | 8.20 | 11.020 | 1 | 8.00 | 11.500 |
| 2 | 9.20 | 11.020 | 2 | 16.20 | 11.500 |
| 3 | 7.10 | 11.020 | 3 | 16.50 | 11.500 |

TABLE 2-continued

Annualized Wave Averages
Grays Harbor, WA Buoy (125.99 feet)

| | January 2001 | | | February 2001 | |
|---|---|---|---|---|---|
| Day | Wave Height (ft.) | Period (sec) | Day | Wave Height (ft.) | Period (sec) |
| 4 | 10.20 | 11.020 | 4 | 7.50 | 11.500 |
| 5 | 9.80 | 11.020 | 5 | 11.80 | 11.500 |
| 6 | 13.60 | 11.020 | 6 | 6.40 | 11.500 |
| 7 | 6.30 | 11.020 | 7 | 7.80 | 11.500 |
| 8 | 7.00 | 11.020 | 8 | 5.50 | 11.500 |
| 9 | 10.30 | 11.020 | 9 | 9.40 | 11.500 |
| 10 | 16.50 | 11.020 | 10 | 9.40 | 11.500 |
| 11 | 9.10 | 11.020 | 11 | 6.90 | 11.500 |
| 12 | 10.60 | 11.020 | 12 | 6.60 | 11.500 |
| 13 | 6.50 | 11.020 | 13 | 5.20 | 11.500 |
| 14 | 12.10 | 11.020 | 14 | 4.10 | 11.500 |
| 15 | 8.80 | 11.020 | 15 | 5.60 | 11.500 |
| 16 | 5.30 | 11.020 | 16 | 5.70 | 11.500 |
| 17 | 8.40 | 11.020 | 17 | 5.00 | 11.500 |
| 18 | 9.30 | 11.020 | 18 | 7.20 | 11.500 |
| 19 | 14.40 | 11.020 | 19 | 5.60 | 11.500 |
| 20 | 9.70 | 11.020 | 20 | 6.80 | 11.500 |
| 21 | 17.20 | 11.020 | 21 | 6.60 | 11.500 |
| 22 | 7.10 | 11.020 | 22 | 6.80 | 11.500 |
| 23 | 8.40 | 11.020 | 23 | 6.50 | 11.500 |
| 24 | 9.00 | 11.020 | 24 | 5.60 | 11.500 |
| 25 | 9.10 | 11.020 | 25 | 4.90 | 11.500 |
| 26 | 10.50 | 11.020 | 26 | 6.70 | 11.500 |
| 27 | 9.80 | 11.020 | 27 | 5.60 | 11.500 |
| 28 | 5.00 | 11.020 | 28 | 6.70 | 11.500 |
| 29 | 19.00 | 11.020 | | | |
| 30 | 9.40 | 11.020 | | | |
| 31 | 9.60 | 11.020 | | | |
| AVG. | 9.89 | 11.020 | AVG. | 7.38 | 11.500 |
| 31 | Total Days in Operation | | 26 | Total Days in Operation | |
| 9.89 | Operational Day Wave Height Average (ft.) | | 7.60 | Operational Day Wave Height Average (ft.) | |
| 8.75 | Operational Year Wave Height Average (ft.) | | 57 | Operational Year Wave Height Average (ft.) | |

In Table 2, the wave heights were measured for each respective day of the month to achieve a daily average. Wave period was averaged for the entire month and the same wave period was used for each day of the month. For January 2001, there were 31 total operation days, given an exemplary buoyancy pump device having a minimum wave height operational requirement of 5 ft. For February 2001, because day 14 and day 25 had wave heights less than 5 ft., there were only 26 operation days for the exemplary buoyancy pump device. The average of the wave heights on the operational days for January and February were thus determined to be 9.89 ft. and 7.60 ft., respectively. The annualized operational wave height for January and February 2001, would be averaged at 8.75 ft. and have 56 days of operation.

For example, for calendar year 2001 at the Point Reyes, Calif. buoy, the number of operational days would be 331 with an average wave height of 9.01 ft. A user of a buoyancy pump device disclosed herein would thus be able to obtain the publicly available data and determine effective annualized wave-heights and operation days for a given buoyancy pump device configuration.

The components of the buoyancy pump device 100 must be adapted to function in a saline environment, such as an ocean. Accordingly, the components of the buoyancy pump device 100 must have anti-oxidation properties and/or otherwise be corrosive-resistant. To provide for minimal environmental impact, the inlet 126 of the piston chamber 122 which may be exposed to the surrounding environment may have a filter placed thereon to filter out undesired components. In the case of seaweed or other decaying material such as algae entering into the buoyancy chamber 112 or the buoyancy cylinder 104, the seaweed will act as a natural lubricant between the moving components of the buoyancy pump device 100.

For example, if algae were to become lodged between the shims 140 and the buoyancy block 114, the algae would reduce the friction between the shims 140 and the buoyancy block 114, thereby increasing the buoyancy pump device efficiency.

Figure 5:
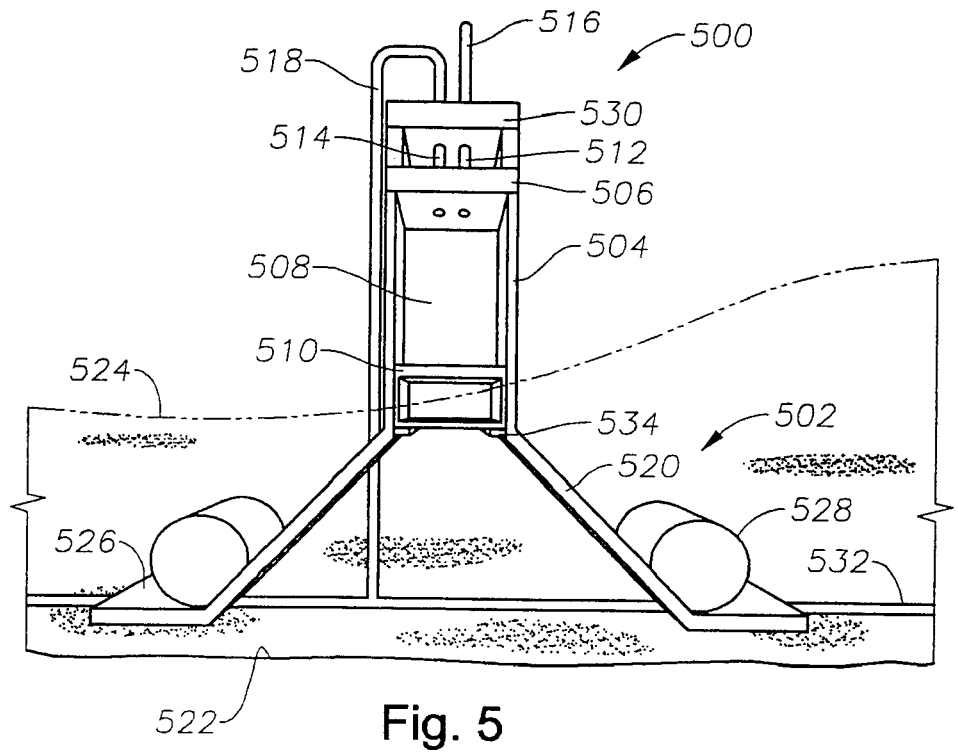
FIG. 5 is an elevated side view of an alternate embodiment of an exemplary buoyancy pump device.

Referring now to FIG. 5, an elevated side plan view of an alternate embodiment of a buoyancy pump device 500 is shown in accordance with the principles of the present invention. The buoyancy pump device 500 includes a base 502, a buoyancy cylinder 504 connected at one end to the base 502 and enclosed at the other end by a buoyancy cylinder cap 506 and aligned generally coaxially with the buoyancy cylinder 504. The other end of the buoyancy cylinder 504 is open and exposed to the environment. The buoyancy cylinder 504 and buoyancy cylinder cap 506 collectively define a buoyancy chamber 508 therein.

A buoyancy block 510 generally cylindrical in shape is slidably positioned with the buoyancy chamber 508 to move axially therein. It is to be appreciated that the buoyancy pump device 500 in this embodiment eliminates the need for a piston and piston shaft by combining the buoyancy block of FIG. 1 and the buoyancy block and piston of FIG. 1 into one equivalent buoyancy block 510.

An inlet valve 512 and an outlet valve 514 extend through the buoyancy cylinder cap 506 in communication with the buoyancy chamber 508 to allow gas or liquid to flow therethrough. An inlet line 516 and an outlet line 518 are connected to the inlet valve 512 and outlet 514, respectively, and are adapted to receive and exhaust, respectively, gas or liquid from the other ends.

The base 502 may have a plurality of legs 520 extending towards a floor 522 of the body of water 524. A support base 526 is coupled through the legs 520 to secure the buoyancy pump device 500 on the floor 522. The base 502 connects to ballast tanks 528 for maintaining the buoyancy pump device 500 in a fixed position relative to the environment.

Positioned axially above the buoyancy cylinder cap 506 is a ballast cap 530 which further serves to stabilize the buoyancy pump device 500. The ballast cap 530 is adapted to allow the valves 512, 514 and lines 516, 518 to communicate therethrough. Instead of a storage tank, the outlet line 518 may be connected to a flow line 532 to move gas or liquids flowing through the flow line to a desired location (not shown).

The buoyancy block 510 disposed within the buoyancy chamber 508 has a predetermined buoyancy, such that the buoyancy block 510 moves in a cycle conforming to the fluid dynamics of the water in which the buoyancy pump device 500 is positioned and the hydraulic or pneumatic system characteristics of the buoyancy pump device 500 itself. The buoyancy of the buoyancy block 510 may be adjusted in a manner as described above. Stops 534 are disposed on an inner perimeter at a lower end of the buoyancy cylinder 504 to prevent the buoyancy block 510 from withdrawing outside of the buoyancy cylinder 504. The buoyancy block 510 has a seal formed about the perimeter of the buoyancy block 510 to prevent communication between the buoyancy chamber 508 and the water 524.

The inlet and outlet valves 512, 514 are unidirectional flow devices which permit the flow of gas or liquid into and out of the buoyancy chamber 508, respectively. It is to be appreciated that the valves 512, 514 may be positioned at differing locations, so long as a desired pressure is achievable within the buoyancy chamber 508.

In operation, as waves pass the buoyancy pump device 500, water contacts the buoyancy block 510 through the opening in the buoyancy cylinder 504 to raise the buoyancy block 510 in a cycle conforming to the fluid dynamics of the water and the hydraulic or pneumatic system characteristics of the buoyancy pump device 500. Gas or liquid in the buoyancy chamber 508 is expelled or exhausted through the outlet valve 514 and outlet line 518 into the flow line 532. As the wave departs the buoyancy pump device 500, the buoyancy block 510 incrementally descends as urged by gravity, creating a vacuum within the buoyancy chamber 508. Accordingly, gas or liquid is entered in through the inlet line 516 and inlet valve 512 into the buoyancy chamber 508.

As the next successive wave approaches, gas or liquid that has been drawn into the buoyancy chamber 508 is again expelled through the outlet valve 512, outline line 518 and flow line 532 in relation to the position of the buoyancy block as it rises with respect to the wave.

Figure 6:
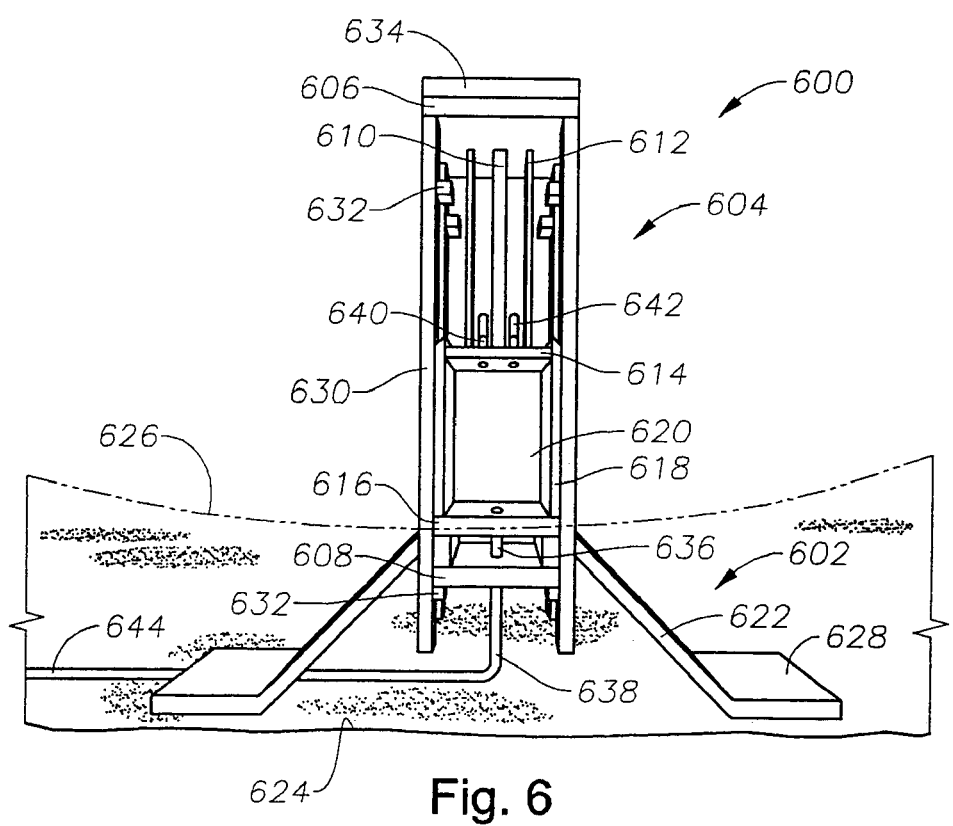
FIG. 6 is an elevated side view of yet another embodiment of an exemplary buoyancy pump device.

Referring now to FIG. 6, an elevated side view of yet another embodiment of a buoyancy pump device 600 is shown. The buoyancy pump device 600 includes a base 602, a buoyancy housing 604 connected to the base 602, a buoyancy housing cap 606 coupled to the buoyancy housing 604, and a buoyancy housing base 608 coupled to the other end of the buoyancy housing 604.

Axially descending from the buoyancy housing cap 606 and connected thereto is a piston shaft 610 and a plurality of piston supports 612. Connected to the other end of the piston shaft 610 and piston supports 612 is a piston 614. Between the piston 614 and the buoyancy housing base 608 is positioned a buoyancy block 616 having buoyancy block walls 618 extending towards the buoyancy housing cap 606. The buoyancy block 616, buoyancy block walls 618, and piston 614 form a piston chamber 620 therein. The buoyancy block walls 618 are adapted to slidably move between the piston 614 and the buoyancy housing 604.

The base 602 has a plurality of legs 622 descending towards a floor 624 of the body of water 626. Base supports 628 are connected to the legs 622 and positioned on the floor 624 of the water 626. The base supports 628 may be filled with a suitable ballast to maintain the position of the buoyancy pump device 600 in a position relative to the water 626.

The buoyancy housing 604 comprises four vertically extending posts 630 coupled to and positioned between the buoyancy housing cap 606 and the buoyancy housing base 608. A plurality of stops 632 are positioned on respective upper and lower portions of the posts 630 to maintain the buoyancy block 616 within the buoyancy housing 604 and limit axial movement thereof. At the top of the buoyancy housing 604 a ballast cap 634 is connected thereto to assist in maintaining the buoyancy pump device 600 in a fixed position relative to the water 626. The buoyancy housing base 608 connects on one surface to an outlet valve 636 and at the other surface to an outlet line 638. The buoyancy housing base 608 provides for communication between the outlet valve 636 and the outlet line 638. The outlet line 638 is telescoping in nature, and slidably received through the buoyancy housing base 608 such that should the buoyancy block 616 move in relation to the buoyancy housing base 608, constant communication is maintained between the outlet valve 636 and the outlet line 638. The piston shaft 610 and the piston supports 612 are fixed relative to the buoyancy housing cap 606 and the piston 614 to maintain a fixed position of the piston 614 with respect to the buoyancy housing cap 606.

The piston 614 connects to an inlet valve 640 to allow communication of the inlet valve 640 with the piston chamber 620. The inlet valve 640 in turn is connected to an inlet line 642 to allow communication with the piston chamber 620 and the desired supply source.

The buoyancy block 616 and buoyancy block walls 618 are slidable with respect to the buoyancy housing 604 and buoyancy housing posts 630, such that the buoyancy block 616 and buoyancy block walls 618 may move axially within the buoyancy housing 604. The interface between the piston 614 and the buoyancy walls 618 is preferably sealed such that the piston chamber 620 may be under a fixed pressure with respect to axially movement of the buoyancy block 616 with respect to the piston 614, thereby maintaining a pressure therein.

The inlet and outlet valves 640, 636 are unidirectional flow devices which permit the flow of gas or liquid into and out of the piston chamber 620, respectively. It is to be appreciated that the valves 640, 636 may be positioned at differing locations on the buoyancy housing cap 606, so long as a desired pressure is achievable within the piston chamber 620.

In operation, as a wave having predetermined characteristics approaches and contacts the buoyancy block 616 and buoyancy block walls 618, the buoyancy block 616 and buoyancy block walls 618 move axially upward relative to the cycle conforming to the fluid dynamics of the water in which the buoyancy pump device 600 is positioned and the hydraulic or pneumatic system characteristics of the buoyancy pump device 600 itself. The buoyancy of the buoyancy block 616 may be adjusted in a manner described above.

The buoyancy block 616 pressurizes the gas or liquid in the piston chamber 620, such that the gas or liquid within the piston chamber 620 is expelled through the outlet valve 636 and outlet line 638 to be transported to a desired location through a flow line 644 coupled to the outlet line 638. As the wave departs the buoyancy pump device 600, gravity urges the buoyancy block 616 and buoyancy block walls 618 downward, thereby creating a vacuum within the piston chamber 620. Gas or liquid is then drawn through the inlet line 642 and inlet valve 640 into the piston chamber 620 until the buoyancy block either contacts the stops or reaches the trough of the wave. As the next wave cyclically approaches the buoyancy pump device 600, the process is then repeated.

Figure 7:
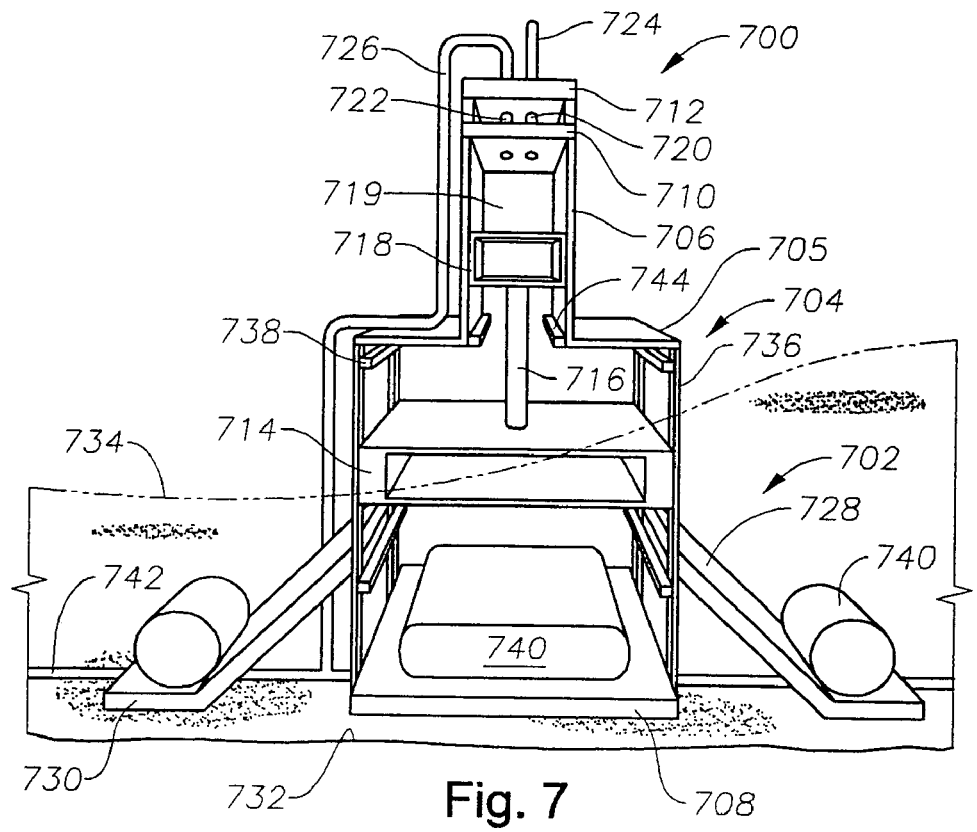
FIG. 7 is an elevated side view of another embodiment of an exemplary buoyancy pump device.

Referring now to FIG. 7, an elevated side view of yet another embodiment of a buoyancy pump device 700 is shown. The buoyancy pump device 700 includes a base 702, a buoyancy housing 704, a buoyancy housing cap 705 connected to the buoyancy housing, a piston housing 706 connected to the buoyancy housing cap 705, a buoyancy housing base 708 connected to the other end of the buoyancy housing 704, the piston housing cap 710 connected to the piston housing 706, and a ballast cap 712 positioned above the piston housing cap 710 and coupled thereto.

A buoyancy block 714 is axially disposed within the buoyancy housing 704. A piston shaft 716 connects to the upper surface of the buoyancy block 714 at one end and to a piston 718 axially disposed within the piston housing 706 at the other end. A piston chamber 719 is formed between the upper surface of the piston 718, the lower surface of the piston housing cap 710 and the piston housing 706.

An inlet valve 720 and an outlet valve 722 are connected to the piston chamber 719 through the piston housing cap 710. The inlet valve 720 and outlet valve 722 extend through the ballast cap 712 and connect to an inlet line 724 and an outlet line 726, respectively.

The base 702 has a plurality of support legs 728 which extend toward a support base 730. The support base 730 preferably seats on a floor 732 of the body of water 734.

The buoyancy housing 704 has a plurality of buoyancy housing legs 736 extending towards the buoyancy housing base 708 and connected thereto. The buoyancy housing legs 736 allow water 734 to pass therethrough. A plurality of buoyancy block stops 738 are disposed at upper and lower locations on an inner surface of the buoyancy housing legs 736 to limit axial movement of the buoyancy block 714 within the buoyancy housing 704.

The buoyancy housing base 708 has a ballast tank 740 positioned thereon to maintain the position of the buoyancy pump device 700 relative to the body of water 734. The buoyancy housing base 708 is further connected to a flow line 742 and allows the flow line 742 to flow through the buoyancy housing base 708.

The piston housing 706 has a plurality of piston stops 744 disposed at a lower end of and inside of the piston housing 706 to limit axial movement of the piston 718 in the piston housing 706. The piston housing 706 is further adapted to allow slidable axial movement of the piston 718 within the piston housing 706.

The ballast cap 712 may be used to further stabilize the buoyancy pump device 700 with respect to the body of water 734 by having a predetermined ballast or a variable ballast within the ballast cap 712.

The buoyancy block 714, which may be adjustable in the manner described above, is adapted to slidably axially move within the buoyancy housing 704 as limited by a cycle conforming to the fluid dynamics of the water 734 in which the buoyancy pump device 700 is positioned and the hydraulic or pneumatic system characteristics of the buoyancy pump device 700 itself.

The piston shaft 716 is preferably rigid and maintains a fixed relationship between the piston 718 and the buoyancy block 714. The piston 718 is exposed to water on the lower end due to the opened end of the piston housing 706 disposed towards the buoyancy block 714. The piston 718 preferably has a seal (not shown) disposed about the perimeter of the piston 718 which prevents leaking or seepage from the piston chamber 719 into the area beneath the piston. In such a manner, the piston chamber is therefore kept free from the external environment and provides an effective location for pumping gas or liquid therein in a pressure relationship.

The inlet and outlet valves 720, 722 are unidirectional flow devices which permit the flow of gas or liquid in to and out of the piston chamber 719, respectively. It is to be appreciated that the valves 720, 722 may be positioned at different locations on the piston housing cap 710, so long as a desired pressure is achievable within the piston chamber 719.

The inlet line 724 is adapted to be connected into a desired gas or liquid, and therefore provide a desired source of gas or liquid to be pumped by the buoyancy pumping device 700. The outlet line 726 is coupled to the flow line 742, which in turn directs flow to a desired location.

In operation, as a wave approaches the buoyancy pump device 700, the buoyancy block 714, having a predetermined buoyancy, incrementally rises with respect to the wave. The piston 718 will move in direct relation to the buoyancy block 714, thereby expelling gas or liquid from the piston chamber 719 through the outlet valve 722, outlet line 726, and flow line 742. As the wave departs the buoyancy pump device 700, the buoyancy block 714, urged by gravity, descends with respect to the wave. The piston 718, moving in direct relation to the descent of the buoyancy block 714, likewise descends, thereby creating a vacuum within the piston chamber 719. Gas or liquid is drawn through the inlet line 724 and inlet valve 720 into the piston chamber 719, thereby filling the piston chamber 719. The cycle continues to repeat in relation to the cycle conforming to the fluid dynamics of the water and the hydraulic or pneumatic system characteristics of the buoyancy pump device 700 itself.

Figure 8:
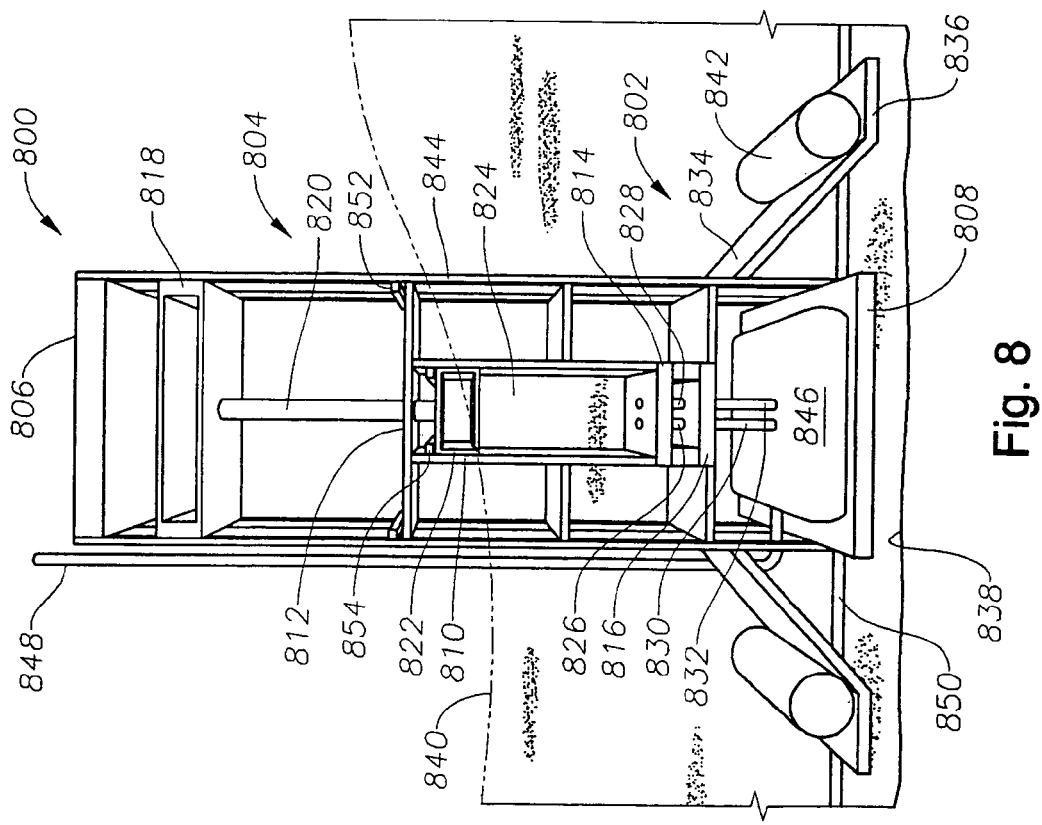
FIG. 8 is an elevated side view of yet another embodiment of an exemplary wave-pump another alternate embodiment of an buoyancy pump device.

Referring now to FIG. 8, a side elevational view of an alternative embodiment of an exemplary buoyancy pumping device 800 is shown in accordance with the principles of the present invention. The buoyancy pump device 800 includes a base 802, a housing 804 connected to the base 802, a housing cap 806 connected to the housing 804, and a housing base 808 connected to the other end of the housing 804. A piston housing 810 is axially disposed in a lower portion of the housing 804. The piston housing 810 includes a piston housing cap 812 and a piston housing base 814. A piston housing ballast portion 816 is connected to the piston housing 810 at a lower portion thereof.

A buoyancy block 818 having a predetermined buoyancy, is disposed within the housing 804. A piston shaft 820 is connected to a lower end of the buoyancy block 818 and extends axially therefrom. A piston 822 is connected to the other end of the piston shaft 820. The piston 822 is adapted to axially move within the piston housing 810. A piston chamber 824 is formed by a lower surface of the piston 822, the piston housing base 814 and the piston housing 810.

An inlet valve is connected through the piston housing base 814 and in communication with the piston chamber 824. Likewise, an outlet valve 828 is connected to the piston housing base 814 and in communication with the piston chamber 824. An inlet line 830 and an outlet line 832 is connected to the other respective ends of the inlet valve 826 and outlet valve 828.

The base 802 includes support legs 834 which extend and connect to a support base 836. The support base 836 is adapted to rest against a floor 838 of the body of water 840. Ballast tanks 842 are connected to an upper surface of the support base 836 and adapted to receive and/or expel ballast and thereby maintain the position of the buoyancy pump device 800 with respect to the body of water 840.

The housing 804 comprises a plurality of housing legs 844 connected to the housing base 808 at one end and to the housing cap 806 at the other end. The housing legs 844 allow water to freely flow therebetween.

A flow tank 846 is connected to the inlet line 830 and outlet line 832, and positioned on a surface of the housing base 808. The flow tank 846 is further connected to a supply line 848 and a flow line 850. The flow tank 846 may control flow to and from the piston chamber 824, and direct outlet flow from the piston chamber 824 to a desired location through the flow line 850.

The buoyancy of the buoyancy block 818 is adjustable in a manner described above. The buoyancy block 818 is adapted to slideably axially move within the housing 804 in a cycle conforming to the fluid dynamics of the water 840 in which the buoyancy pump device 800 is positioned and the hydraulic or pneumatic system characteristics of the buoyancy pump device 800 itself.

The piston shaft 820 maintains the buoyancy block 818 and the piston 822 in a fixed relationship, such that movement of the buoyancy block 818 corresponds to movement of the piston 822.

The housing 804 has a plurality of buoyancy block stops 852 positioned on an inside of the housing legs 844 to limit axial movement of the buoyancy block 818 therein. Likewise, the piston housing 810 has a plurality of piston stops 854 on an inner surface of the piston housing 810 adapted to limit the axial movement of the piston 822 therein.

The inlet valve 826 and outlet valve 828 are unidirectional flow devices which permit the flow of gas or liquid into and out of the piston chamber 824, respectively. It is to be appreciated that the valves 826, 828 may be positioned at differing locations on the piston housing base 814, so long as the desired pressure is achievable within the piston chamber 824.

In operation, as a wave having predetermined characteristics arrives at the buoyancy pump device 800, the buoyancy block 818 and piston 822 incrementally rise. A vacuum is created within the piston chamber 824, thereby drawing gas or liquid, depending on the supply source connected to the supply line 848 is drawn into the piston chamber 824 through the inlet line 830 and inlet valve 826. As the wave departs the buoyancy pump device 800, gravity urges the buoyancy piston axially downward, thereby compressing the gas or liquid within the piston chamber 824 and exhausting or expelling the gas or liquid within the piston chamber 824 through the outlet valve 828, outlet line 832, flow tank 846 and flow line 850.

Figure 9:
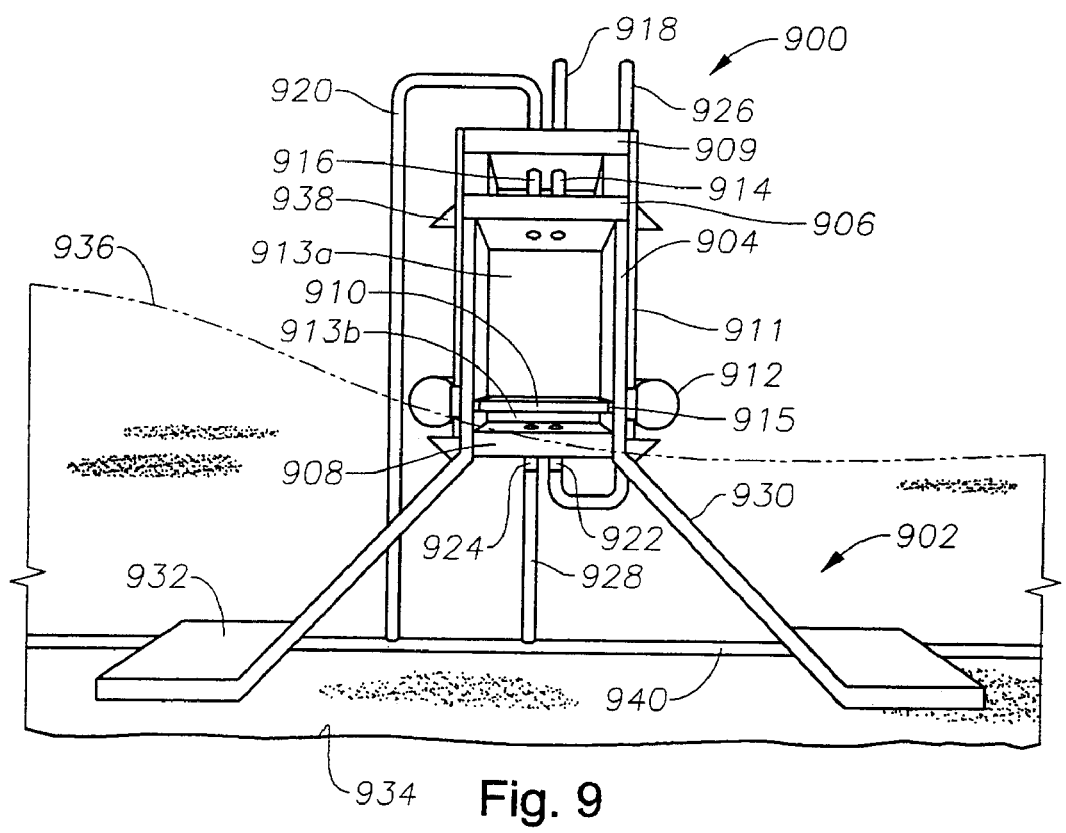
FIG. 9 is an elevated side view of another embodiment of an exemplary buoyancy pump device.

Referring now to FIG. 9, a side elevational view in an alternative embodiment of an exemplary buoyancy pump device 900 is shown. The buoyancy pump device 900 includes a base 902, a housing 904 connected to a base 902, a housing cap 906 and a housing base 908. A housing ballast portion 909 is disposed axially above the housing cap 906.

A metallized piston 910 is disposed within the housing 904 and is adapted to axially move within the housing 904. Positioned outside of the housing 904 and adjacent to the ends of the piston 910 are a plurality of magnetized buoyancy blocks 912, having predetermined buoyancy. The magnetized buoyancy blocks 912 are positioned next to the metallized piston 910, such that movement of the magnetized buoyancy block 912 corresponds to movement of the metallized piston 910 within the housing 904. A guide rail 911 is provided on the housing 904 to guide movement of the magnetized buoyancy block 912 in relation to the metallized piston 910. Piston chambers 913a, 913b are defined on opposite sides of the piston 910. A non-metallic seal 915 may be placed on and coupled to an outer surface of the metallized piston 910 between the metallized piston 910 and the housing 904 to prevent fluid or liquid flow between the piston chambers 913a, 913b.

A first inlet valve 914 and a first outlet valve 916 are connected through the housing cap 906 with the piston chamber 913a. The first inlet valve 914 and first outlet valve 916 are connected through the housing ballast portion 909 to a first inlet line 918 and a first outlet line 920, respectively.

A second inlet valve 922 and a second outlet valve 924 are connected at one end through the housing base 908 with the piston chamber 913b. The second inlet valve 922 and second outlet valve 924 are connected at other respective ends to the second inlet line 926 and second outlet line 928.

The base 902 includes a plurality of support legs 930 coupled at one end to the housing 904 and at the other end to a support base 932. The support base 932 is adapted to rest against a floor 934 of a body of water 936 in which the buoyancy pump device 900 is placed.

The housing 904 includes a plurality of stops 938 on an external surface, which are adapted to limit axial movement of the magnetized buoyancy blocks 912. The outlet lines 920, 928 are connected to a flow line 940 for transmission of flow therein to a desired location.

The magnetized buoyancy blocks 912 move in a cycle conforming to the fluid dynamics of the water in which the buoyancy pump device 900 is positioned and the hydraulic or pneumatic system characteristics of the buoyancy pump device 900 itself. The buoyancy of the magnetized buoyancy blocks 912 may be adjusted by flooding the magnetized buoyancy blocks 912 with a predetermined fluid or solid, or expelling from the magnetized buoyancy blocks 912 the predetermined fluid or solid.

The inlet valves 914, 922 and outlet valves 916, 924 are unidirectional flow devices which permit the flow of gas or liquid into and out of the piston chambers 913a, 913b. For example, the first inlet valve 914 allows flow into piston chamber 913a, and the first outlet valve 916 allows flow out of the piston chamber 913a. The second inlet valve 922 and second outlet valve 924 allow flow into and out of the piston chamber 913b. It is to be appreciated that the first inlet valve 914 and first outlet valve 916 may be positioned at differing locations on the housing cap 906. Likewise, the second inlet valve 922 and second outlet valve 924 may be positioned at differing locations on the housing base 908, so long as a desired pressure is achievable within the piston chambers 913a, 913b.

In operation, as a wave from the body of water 946 departs the buoyancy pump device 900, the magnetized buoyancy blocks 912 incrementally lower due to gravity, thereby magnetically lowering the metallized piston 910 to create a vacuum within the piston chamber 913a. At the same time, the dropping of the magnetized buoyancy blocks 912 and metallized piston 910 compresses the gas or liquid within the piston chamber 913b. The gas or liquid therein is exhausted or expelled through the second outlet valve 924, second outlet line 928 and into the flow line 940. In the piston chamber 913a, the vacuum draws gas or liquid from the first inlet line 918 through the first inlet valve 914, and into the piston chamber 913a.

As the next wave approaches, the magnetized buoyancy blocks 912 and metallized piston 910 incrementally rise in a magnetic interrelationship with respect to the passing water 936, thereby pressurizing the gas or liquid within the piston chamber 913a and expelling the gas or liquid through the first outlet valve 916 and first outlet line 920 into flow line 940. The piston chamber 913b becomes a vacuum, thereby drawing gas or liquid through the second inlet line 926, second inlet valve 922 and into the piston chamber 913b. The process is cyclically repeated with each successive wave.

Should the pressure in either outlet valve 916, 924 inhibit movement of the metallized piston 910, the magnetic buoyancy blocks 912 will separate from the metallized piston 910 to move with respect to the wave, and re-engage the metallized piston 910 in the next wave cycle.

Figure 10:
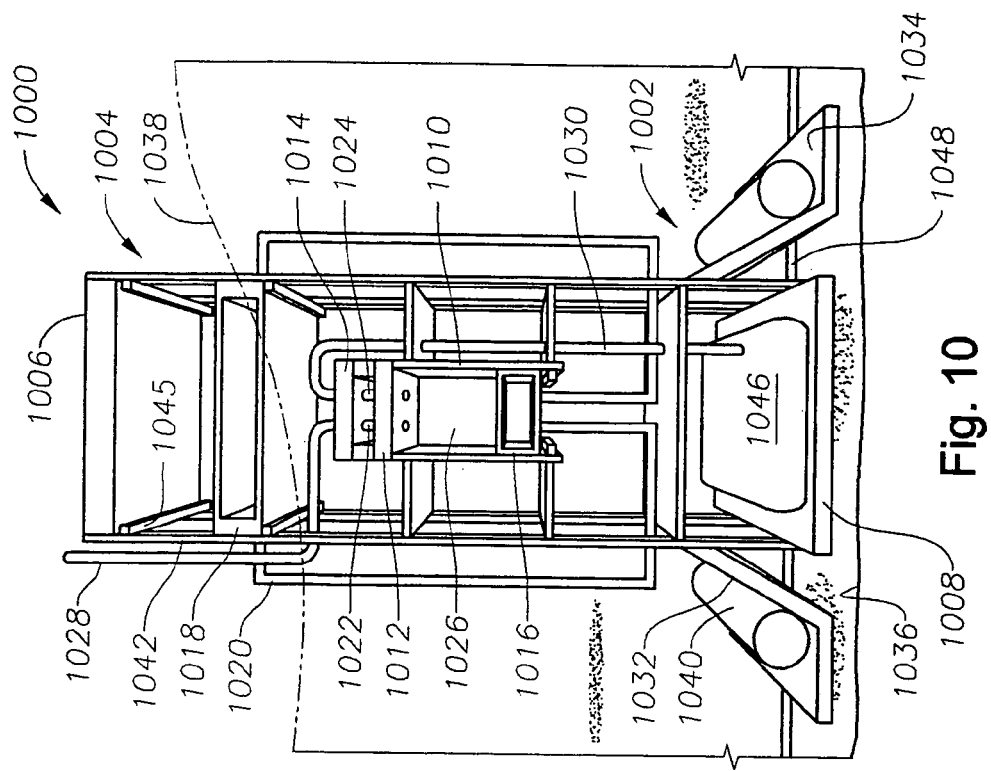
FIG. 10 is an elevated side view of yet another embodiment of an exemplary buoyancy pump device.

Referring now to FIG. 10, yet another embodiment of an exemplary buoyancy pump device 1000 is shown in accordance with the principles of the present invention. Buoyancy pump device 1000 includes a base 1002, a housing 1004 connected to the base 1002, a housing cap 1006 connected to the housing 1004 and a housing base 1008. A piston cylinder 1010 is disposed within the housing 1004 and includes a piston cylinder cap 1012, and a piston cylinder ballast portion 1014 connected to the piston cylinder 1010 and disposed above the piston cylinder cap 1012. A piston 1016 is adapted to axially move within the piston cylinder 1010. A buoyancy block 1018 is axially positioned with the housing 1004 above the piston cylinder 1010 and is adapted to axially move within the housing 1004. A plurality of piston shafts 1020 extend from a lower surface of the piston 1016 and connected to lateral surfaces of the buoyancy block 1018.

An inlet valve 1022 and an outlet valve 1024 are connected through the piston cylinder cap 1012 to a piston chamber 1026 formed by the piston cylinder cap 1012, piston cylinder 1010 and the upper surface of the piston 1016. An inlet line 1028 and an outlet line 1030 are connected to the inlet valve 1022 and outlet valve 1024 respectively. The inlet line 1028 and outlet line 1030 extend through the piston cylinder ballast portion 1014.

The base 1002 includes support legs 1032 connected to a lower portion of the housing 1004 at one end and to a support base 1034 at the other end. The support base 1034 is adapted to rest against a floor 1036 of a body of water 1038. A ballast tank 1036 is connected to an upper portion of the support base 1034 to maintain the buoyancy pump device 1000 in a fixed position relative to the body of water 1038.

The housing 1004 includes a plurality of housing legs 1042 which are adapted to allow the water 1038 to flow therebetween. The housing legs 1042 connect to the housing base 1008. Housing 1004 further includes a plurality of stops 1045 formed on an inner surface of the plurality of legs 1042 to limit axial movement of the buoyancy block 1018 therein.

Connected to the outlet line is a flow tank 1046, which is connected to the housing base 1008. The flow tank 1046 is adapted to direct flow received from the outlet line 1030 and supply the flow from the outlet line 1040 to a flow line 1048.

The piston cylinder 1010 is open at the end opposing the piston cylinder cap 1012, such that water may contact the bottom surface of the piston 1016. A seal (not shown) is provided on the perimeter of the piston 1016 to prevent communication between the piston chamber 1026 and the body of water 1038.

The piston 1016, which is adjustable in a manner described above, is slidably axially movable within the piston cylinder 1010. Because the piston 1016 and buoyancy block 1018 are connected via the piston shaft 1020, movement of the buoyancy block 1018 corresponds in direct movement of the piston 1016.

The buoyancy block 1018 has a predetermined buoyancy, such that the buoyancy block 1018 moves in a cycle conforming to the fluid dynamics of the water in which the buoyancy pump device 1000 is placed. The buoyancy of the buoyancy block 1018 may be adjusted in a manner described above, depending on the characteristics and fluid dynamics of the water and the system.

The inlet and outlet valves 1022, 1024 are unidirectional flow devices which permit the flow of gas or liquid into and out of the piston chamber 1026, respectively. It is to be appreciated that the valves 1022, 1024 may be positioned at differing locations on the piston cylinder cap 1012, so long as a desired pressure is achievable within the piston chamber 1026.

In operation, after the buoyancy pump device 1000 has been initially placed in a body of water, such as ocean, lake, river or other wave producing environment, the initial pressure in the outlet line 1030, valve 1024 and piston chamber 1026 begins at a zero-pressure state. The wave, having recognized properties, arrives at the buoyancy pump device 1000. Water from the wave incrementally lifts the buoyancy block 1018, thereby lifting the buoyancy block 1018 and a piston 1016. The gas or liquid that has been introduced into the piston chamber 1026 begins to pressurize until the pressure in the piston chamber 1026 overcomes the line pressure in the outlet line 1030. At this point, the gas or liquid flows through the outlet valve 1024 and the outlet line 1030 and is transferred through the flow line 1048 to a desired location for use or storage.

As the wave departs the buoyancy pump device 1000, gravity urges the buoyancy block 1018 down, thereby resulting in a corresponding downward axial movement of the piston 1016 within the piston cylinder 1010. A vacuum is created within the piston chamber 1026, thereby drawing gas or liquid through the inlet line 1028, inlet valve 1022 and into the piston chamber 1026. The cycle is cyclically repeated with each successive wave.

Figure 11:
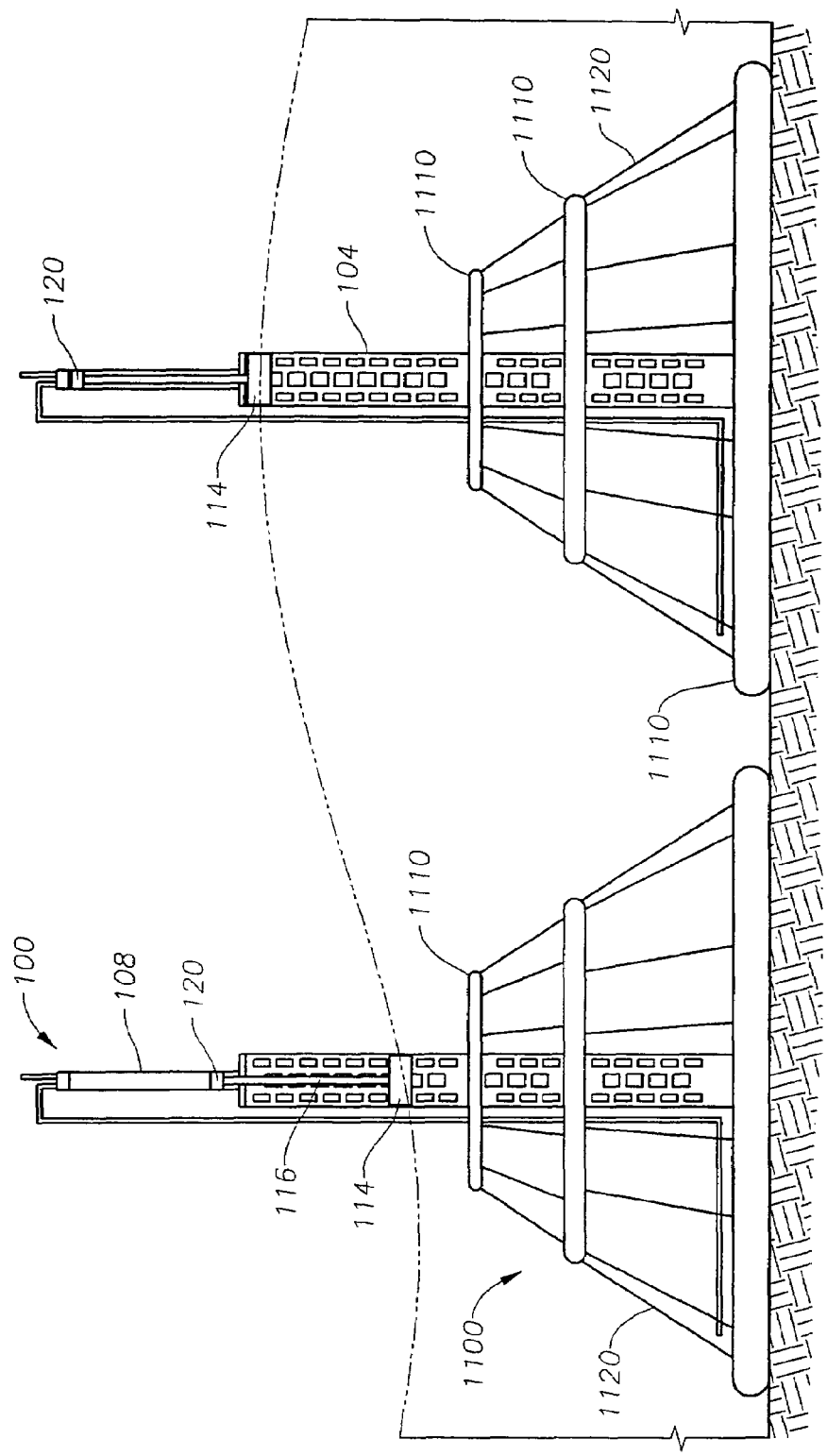
FIG. 11 is an elevated side view of a buoyancy pump device coupled to an exemplary agriculture rig.

Referring now to FIG. 11, there is shown exemplary side views of the buoyancy pump device 100 of FIG. 1 as coupled to an exemplary agriculture rig 1100. In this configuration, the agriculture rig 1100 includes a plurality of ballast tanks 1110 concentrically arranged about and connected to the buoyancy pump device 100. The ballast tanks 1110 are further connected to adjacent ballast tanks 1110 by a plurality of guy wires 1120. The plurality of ballast tanks 1110 may vary in length or width in order to stabilize the buoyancy pump device 100 with respect to oncoming waves from a body of water 1130 in which the buoyancy pump device 100 is positioned.

The previous description is of preferred embodiments for implementing the invention, and the scope of the invention should not necessarily be limited by this description. The scope of the present invention is instead defined by the following claims.

We claim:

1. A buoyancy pump comprising:
 a buoyancy block having an adjustable volume operable to reciprocally move in response to wave action; and
 a piston slideably disposed within a piston cylinder and connected to the buoyancy block, the piston being reciprocally moveable in a first direction and a second direction in response to movement of the buoyancy block, the piston moving in the second direction to draw an operating fluid into the piston cylinder and moving in the first direction to force the operating fluid out of the piston cylinder.

2. The buoyancy pump of claim 1, wherein the buoyancy block further comprises:
 an upper portion; and
 a lower portion moveably coupled to the upper portion.

3. The buoyancy pump of claim 2, wherein the upper portion of the buoyancy block is connected by threads to the lower portion buoyancy block.

4. The buoyancy pump of claim 2, wherein the buoyancy block further comprises means for telescopically adjusting the lower portion with respect to the upper portion.

5. The buoyancy pump of claim 4, wherein the means for telescopically adjusting the lower portion comprises a motor connected to at least one of the lower portion and the upper portion of the buoyancy block, the motor being adapted to move the one of the lower portion and the upper portion relative the other of the lower portion and the upper portion such that the volume of the buoyancy block is adjusted.

6. The buoyancy pump of claim 1, wherein the buoyancy block is radially expandable.

7. The buoyancy pump of claim 6, wherein the buoyancy block further comprises:
 a radially expandable external seal;
 a plurality of outer plates connected to the external seal;
 a plurality of inner plates movably connected to the plurality of outer plates;

a motor connected to a gear, the motor being axially disposed within the buoyancy block; and a plurality of expansion bars connected to the gear and to the outer plates, the plurality of expansion bars being adapted to radially expand and contract the buoyancy block.

8. A buoyancy pump comprising:

a buoyancy block housing defining a buoyancy chamber through which a first fluid may flow;

a buoyancy block having an adjustable volume operable to reciprocally move within the buoyancy chamber in response to wave action of the first fluid, the buoyancy block being sized to fit within the buoyancy chamber and including a tapered region, whereby the sizing and tapering of the buoyancy block reduces lateral movement of the buoyancy block within the buoyancy chamber and reduces binding between the buoyancy block and the buoyancy housing as the buoyancy block reciprocally moves; and a piston slideably disposed within a piston cylinder and connected to the buoyancy block, the piston being reciprocally moveable in a first direction and a second direction in response to movement of the buoyancy block, the piston moving in the second direction to draw a second fluid into the piston cylinder and moving in the first direction to force the second fluid out of the piston cylinder.

9. The buoyancy pump according to claim 8, wherein the first fluid is the same as the second fluid.

10. A buoyancy pump comprising:

a buoyancy block operable to reciprocally move within a buoyancy chamber in response to wave action, the buoyancy block being sized such that a diameter of the buoyancy block is no less than about one-half a wavelength of an average wave for a region in which the buoyancy pump is being operated, the buoyancy block being sized such that the diameter of the buoyancy block is no greater than about the wavelength of the average wave; and a piston slideably disposed within a piston cylinder and connected to the buoyancy block, the piston being reciprocally moveable in a first direction and a second direction in response to movement of the buoyancy block, the piston moving in the second direction to draw an operating fluid into the piston cylinder and moving in the first direction to force the operating fluid out of the piston cylinder.

11. A buoyancy pump comprising:

a buoyancy block housing defining a substantially cylindrical buoyancy chamber, the buoyancy block housing being formed from a substantially cylindrical cage having a plurality of openings through which a first fluid may flow;

a buoyancy block operable to reciprocally move within the buoyancy chamber in response to wave action of the first fluid; and a piston slideably disposed within a piston cylinder and connected to the buoyancy block, the piston being reciprocally moveable in a first direction and a second direction in response to movement of the buoyancy block, the piston moving in the second direction to draw a second fluid into the piston cylinder and moving in the first direction to force the second fluid out of the piston cylinder.

12. The buoyancy pump according to claim 11, wherein the first fluid is the same as the second fluid.

* * * * *